(12) United States Patent
Chen et al.

(10) Patent No.: US 12,445,651 B2
(45) Date of Patent: Oct. 14, 2025

(54) RESIDUAL SIGN PREDICTION OF TRANSFORM COEFFICIENTS IN VIDEO CODING

(71) Applicant: Alibaba Innovation Private Limited, Singapore (SG)

(72) Inventors: Jie Chen, Beijing (CN); Mohammad Golam Sarwer, Cupertino, CA (US); Yan Ye, San Diego, CA (US); Ru-Ling Liao, Beijing (CN); Xinwei Li, Beijing (CN)

(73) Assignee: Alibaba Innovation Private Limited, Singapore (SG)

( * ) Notice: Subject to any disclaimer, the term of this patent is extended or adjusted under 35 U.S.C. 154(b) by 470 days.

(21) Appl. No.: 17/956,752

(22) Filed: Sep. 29, 2022

(65) Prior Publication Data

US 2023/0093994 A1    Mar. 30, 2023

Related U.S. Application Data

(60) Provisional application No. 63/296,370, filed on Jan. 4, 2022, provisional application No. 63/250,202, filed on Sep. 29, 2021.

(51) Int. Cl.
*H04N 19/70* (2014.01)
*H04N 19/176* (2014.01)
(Continued)

(52) U.S. Cl.
CPC ........... *H04N 19/70* (2014.11); *H04N 19/176* (2014.11); *H04N 19/18* (2014.11); *H04N 19/88* (2014.11)

(58) Field of Classification Search
CPC ...... H04N 19/70; H04N 19/176; H04N 19/18; H04N 19/88
See application file for complete search history.

(56) References Cited

U.S. PATENT DOCUMENTS

| 11,856,216 B2 * | 12/2023 | Filippov | H04N 19/18 |
| 2024/0298009 A1 * | 9/2024 | Xiu | H04N 19/61 |

FOREIGN PATENT DOCUMENTS

| EP | 4503608 A1 * | 2/2025 | H04N 19/132 |

OTHER PUBLICATIONS

Coban et al., Algorithm description of Enhanced Compression Model 2 (ECM 2), JVET-W2025, 23$^{rd}$ meeting, by teleconference, Jul. 7-16, 2021, 22 pages.

(Continued)

*Primary Examiner* — Jae N Noh
(74) *Attorney, Agent, or Firm* — Finnegan, Henderson, Farabow, Garrett & Dunner, LLP

(57) ABSTRACT

A VVC-standard encoder and a VVC-standard decoder are provided, implementing a residual sign prediction method utilizing a sorting order of residual coefficients and an expanded region of a TB. As sign prediction accuracy is higher for larger transform coefficient levels, a VVC-standard encoder and a VVC-standard decoder sort transform coefficient signs of a TB in a one-dimensional array, based on corresponding QIdx values instead of the residual coefficient level value. The first n signs according to corresponding QIdx values, ordered from largest to smallest, are predicted using a residual sign prediction method, and the rest of the signs are signaled by EP bins. A sign prediction area is also extended, without limitation to an upper-left 4×4 region within the transform block, but to a region up to 32×32 in size; a VVC-standard encoder signals the maximum dimensions of the region to a VVC-standard decoder in syntax structures of the block.

20 Claims, 21 Drawing Sheets

(51) Int. Cl.
*H04N 19/18* (2014.01)
*H04N 19/88* (2014.01)

(56) References Cited

OTHER PUBLICATIONS

ECM, https://vogit.hhi.fraunhofer.de/ecm/ECM.
Henry et al., "Residual Coefficient Sign Prediction," JVET-D0031, $4^{th}$ Meeting: Chengdu, CN, Oct. 15-21, 2016, 6 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Schwarz et al., "EE2-4.1: Results for dependent quantization with 8 states," JVET-V0082-v1, 22nd Meeting, by teleconference, Apr. 20-28, 2021, 6 pages.
Sullivan et al., "Overview of the High Efficiency Video Coding (HEVC) Standard," IEE Transactions on Circuits and Systems for Video Technology, vol. 22, No. 12, pp. 1649-1668 (2012).

\* cited by examiner

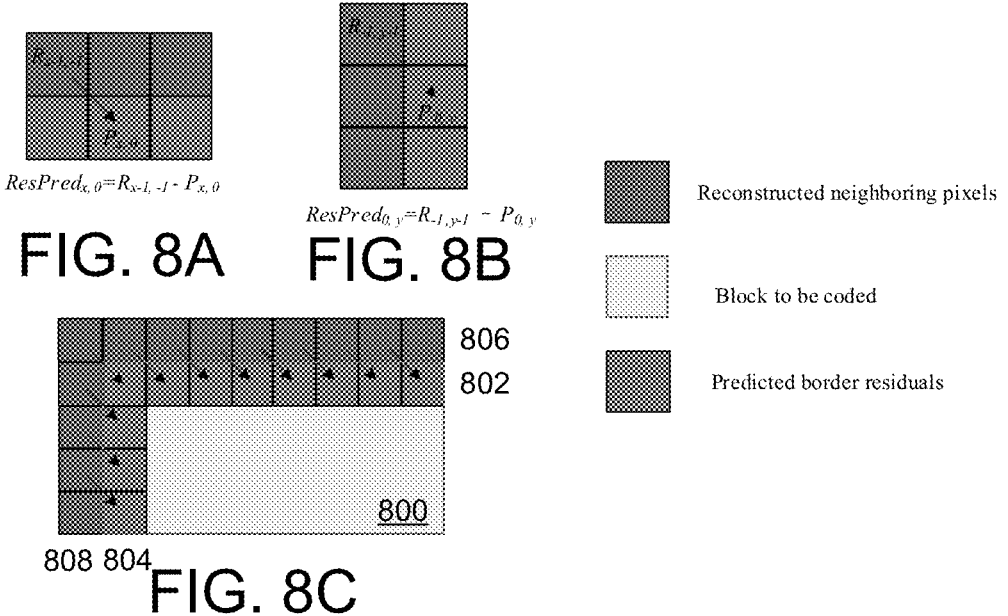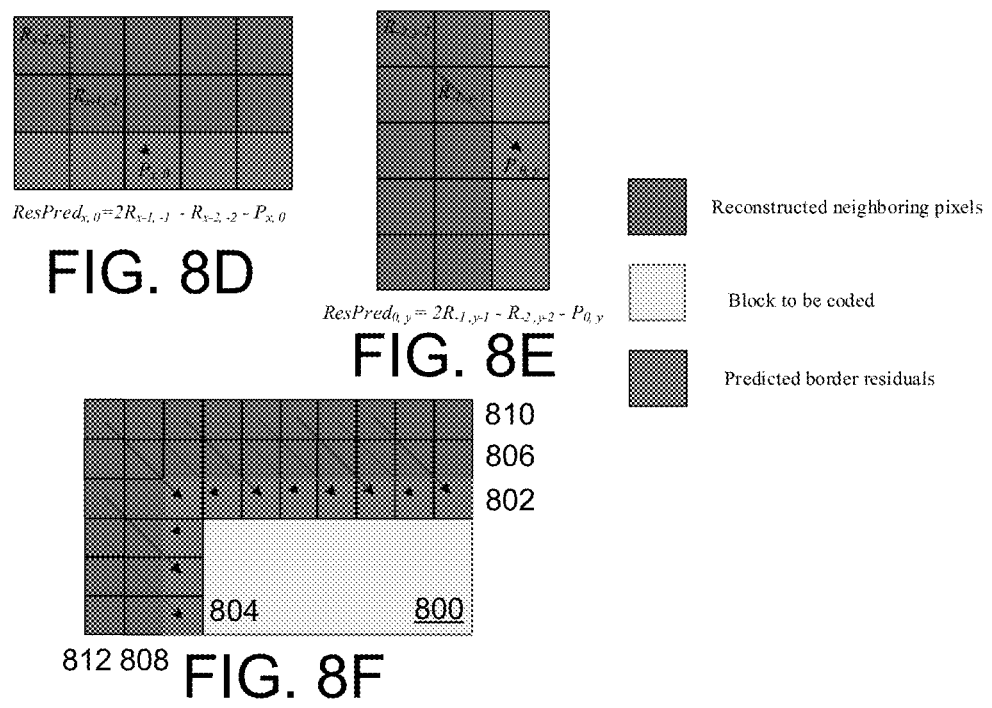

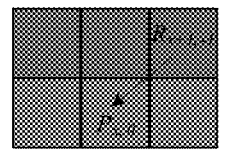
$ResPred_{x,0} = R_{x+1,-1} - P_{x,0}$
FIG. 9A
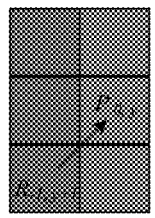
$ResPred_{0,y} = R_{-1,y+1} - P_{0,y}$
FIG. 9B
 Reconstructed neighboring pixels
Block to be coded
Predicted border residuals
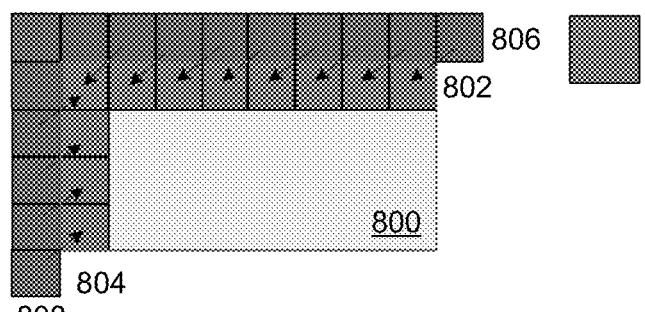
FIG. 9C
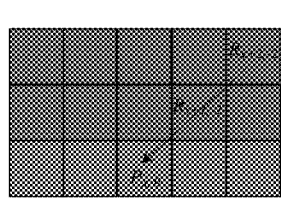
$ResPred_{x,0} = 2R_{x+1,-1} - R_{x+2,-2} - P_{x,0}$
FIG. 9D
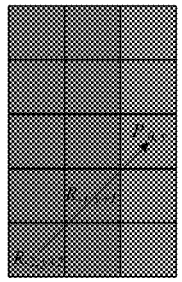
$ResPred_{0,y} = 2R_{-1,y+1} - R_{-2,y+2} - P_{0,y}$
FIG. 9E
 Reconstructed neighboring pixels
 Block to be coded
 Predicted border residuals
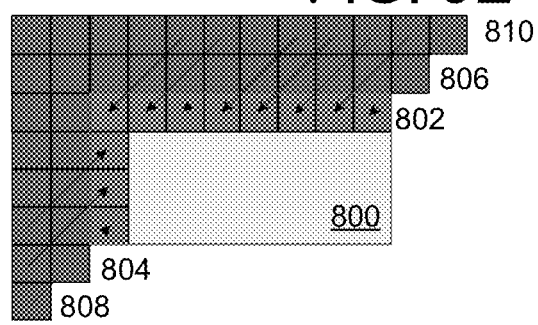
FIG. 9F

$ResPred_{x,0} = R_{x-1,-1} - P_{x,0}$
FIG. 10A
$ResPred_{0,y} = R_{-1,y+1} - P_{0,y}$
FIG. 10B
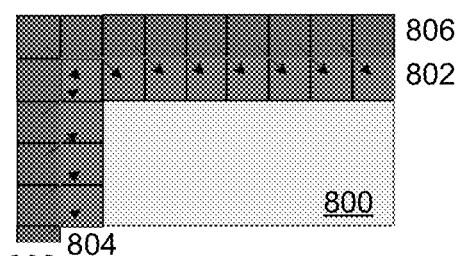
FIG. 10C
$ResPred_{x,0} = 2R_{x-1,-1} - R_{x-2,-2} - P_{x,0}$
FIG. 10D
$ResPred_{0,y} = 2R_{-1,y+1} - R_{-2,y+2} - P_{0,y}$
FIG. 10E
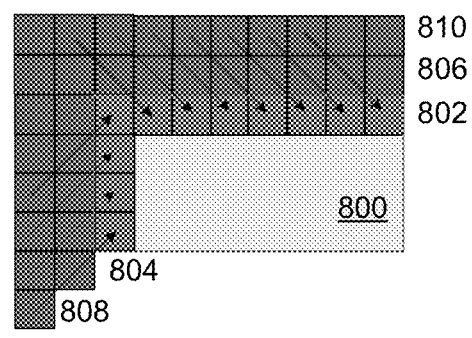
FIG. 10F
Reconstructed neighboring pixels
Block to be coded
Predicted border residuals

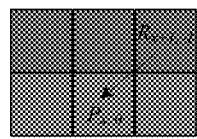
$ResPred_{x,0} = R_{x+1,-1} - P_{x,0}$
FIG. 11A
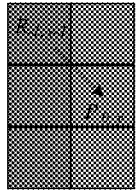
$ResPred_{0,y} = R_{-1,y-1} - P_{0,y}$
FIG. 11B
 Reconstructed neighboring pixels
 Block to be coded
 Predicted border residuals
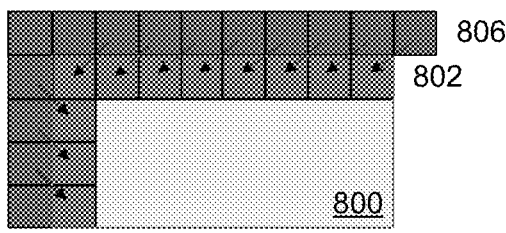
FIG. 11C
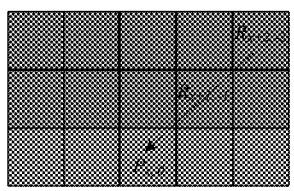
$ResPred_{x,0} = 2R_{x+1,-1} - R_{x+2,-2} - P_{x,0}$
FIG. 11D
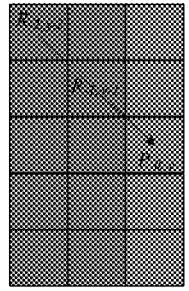
$ResPred_{0,y} = 2R_{-1,y-1} - R_{-2,y-2} - P_{0,y}$
FIG. 11E
 Reconstructed neighboring pixels
 Block to be coded
 Predicted border residuals
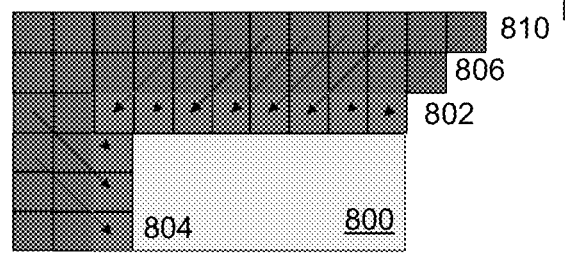
FIG. 11F

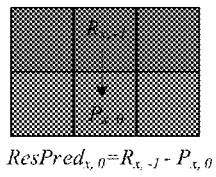
$ResPred_{x,0} = R_{x,-1} - P_{x,0}$
FIG. 12A
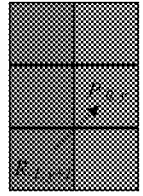
$ResPred_{0,y} = R_{-1,y+1} - P_{0,y}$
FIG. 12B
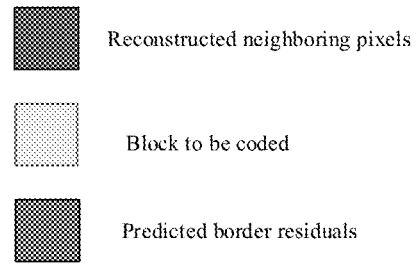
Reconstructed neighboring pixels
Block to be coded
Predicted border residuals
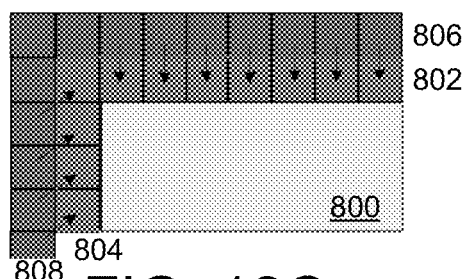
FIG. 12C
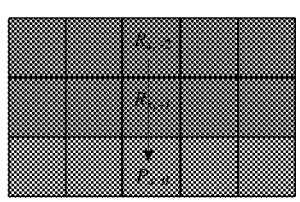
$ResPred_{x,0} = 2R_{x,-1} - R_{x,-2} - P_{x,0}$
FIG. 12D
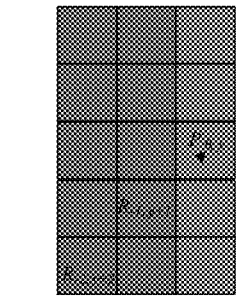
$ResPred_{0,y} = 2R_{-1,y+1} - R_{-2,y+2} - P_{0,y}$
FIG. 12E
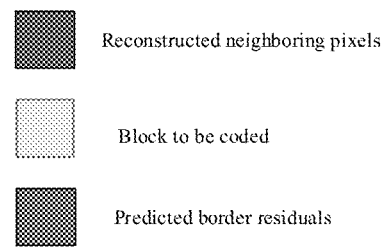
Reconstructed neighboring pixels
Block to be coded
Predicted border residuals
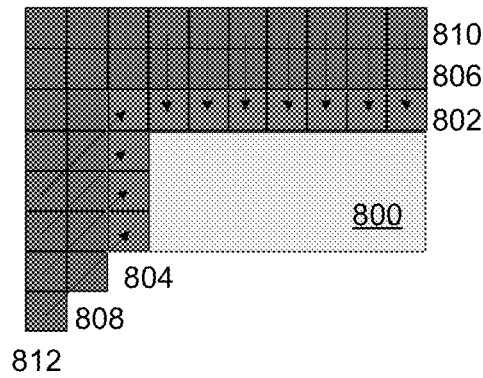
FIG. 12F

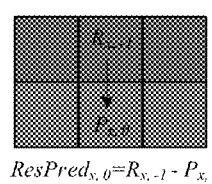
$ResPred_{x,0} = R_{x,-1} - P_{x,0}$
FIG. 13A
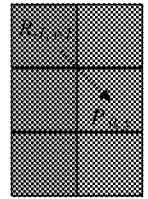
$ResPred_{0,y} = R_{-1,y-1} - P_{0,y}$
FIG. 13B
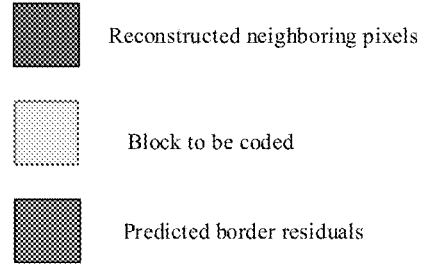
Reconstructed neighboring pixels
Block to be coded
Predicted border residuals
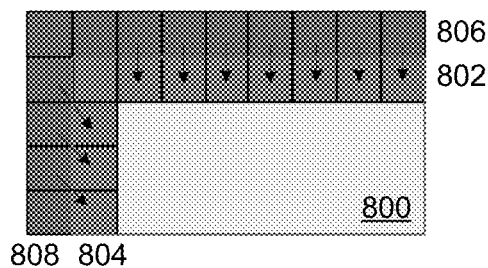
FIG. 13C
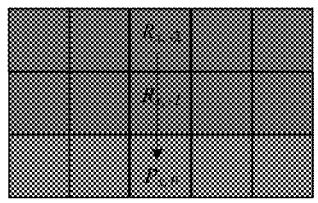
$ResPred_{x,0} = 2R_{x,-1} - R_{x,-2} - P_{x,0}$
FIG. 13D
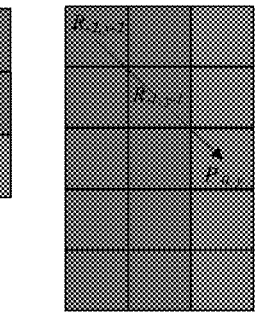
$ResPred_{0,y} = 2R_{-1,y-1} - R_{-2,y-2} - P_{0,y}$
FIG. 13E
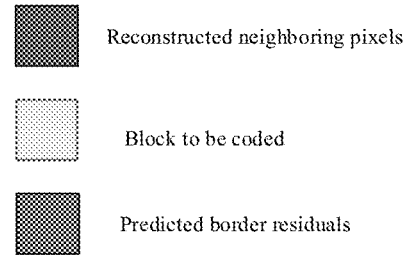
Reconstructed neighboring pixels
Block to be coded
Predicted border residuals
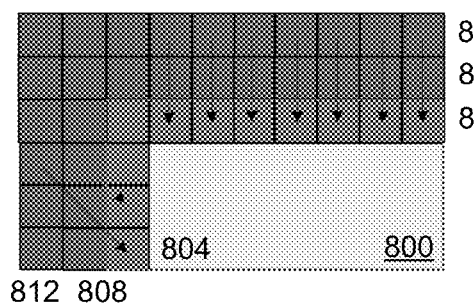
FIG. 13F

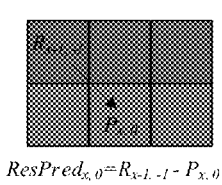
$ResPred_{x,0}=R_{x-1,-1}-P_{x,0}$
FIG. 14A
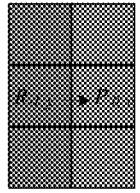
$ResPred_{0,y}=R_{-1,y}-P_{0,y}$
FIG. 14B
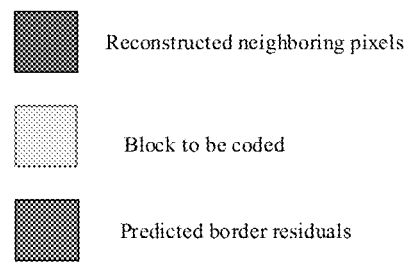
Reconstructed neighboring pixels
Block to be coded
Predicted border residuals
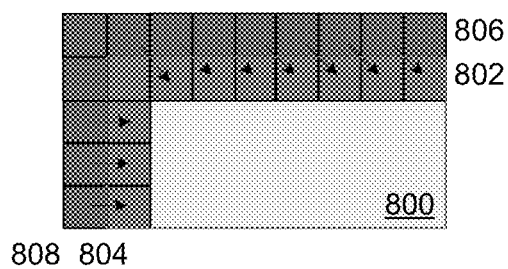
806
802
800
808  804
FIG. 14C
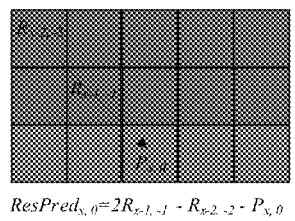
$ResPred_{x,0}=2R_{x-1,-1}-R_{x-2,-2}-P_{x,0}$
FIG. 14D
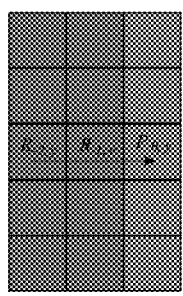
$ResPred_{0,y}=2R_{-1,y}-R_{-2,y}-P_{0,y}$
FIG. 14E
Reconstructed neighboring pixels
Block to be coded
Predicted border residuals
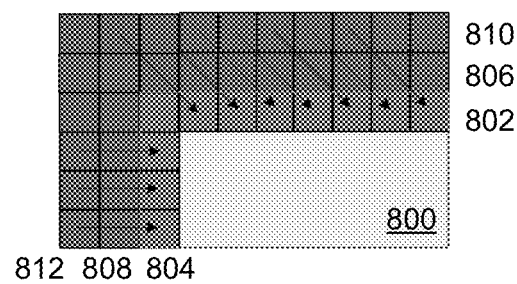
810
806
802
800
812 808 804
FIG. 14F

$ResPred_{x,0} = R_{x+1,-1} - P_{x,0}$
FIG. 15A
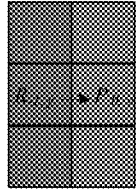
$ResPred_{0,y} = R_{-1,y} - P_{0,y}$
FIG. 15B
 Reconstructed neighboring pixels
 Block to be coded
 Predicted border residuals
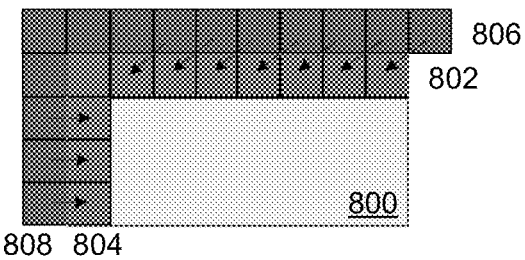
FIG. 15C
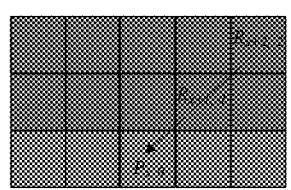
$ResPred_{x,0} = 2R_{x+1,-1} - R_{x+2,-2} - P_{x,0}$
FIG. 15D
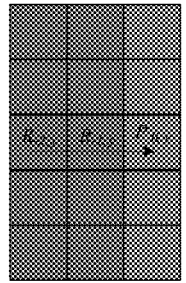
$ResPred_{0,y} = 2R_{-1,y} - R_{-2,y} - P_{0,y}$
FIG. 15E
 Reconstructed neighboring pixels
 Block to be coded
 Predicted border residuals
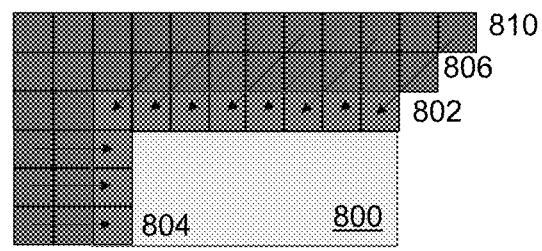
FIG. 15F

RESIDUAL SIGN PREDICTION OF TRANSFORM COEFFICIENTS IN VIDEO CODING

RELATED APPLICATIONS

This application claims the benefit of U.S. Patent Application No. 63/250,202, entitled "IMPROVED RESIDUAL SIGN PREDICTION OF TRANSFORM COEFFICIENTS IN NEXT-GENERATION VIDEO CODING" and filed Sep. 29, 2021, and claims the benefit of U.S. Patent Application No. 63/296,370, entitled "IMPROVED RESIDUAL SIGN PREDICTION OF TRANSFORM COEFFICIENTS IN NEXT-GENERATION VIDEO CODING" and filed Jan. 4, 2022, each of which is expressly incorporated herein by reference in its entirety.

BACKGROUND

In 2020, the Joint Video Experts Team ("JVET") of the ITU-T Video Coding Expert Group ("ITU-T VCEG") and the ISO/IEC Moving Picture Expert Group ("ISO/IEC MPEG") published the final draft of the next-generation video codec specification, Versatile Video Coding ("VVC"). This specification further improves video coding performance over prior standards such as H.264/AVC (Advanced Video Coding) and H.265/HEVC (High Efficiency Video Coding). The JVET continues to propose additional techniques beyond the scope of the VVC standard itself, collected under the Enhanced Compression Model ("ECM") title.

In each of the AVC, HEVC, and VVC standards, discrete cosine transform ("DCT") techniques are a foundational image compression technique for efficient video coding. Images are partitioned into coding blocks, and a prediction computation is performed upon each coding block to derive a prediction unit and a residual; a transform computation is then performed on the residual to derive an array of coefficients. Based on the residual coefficients, a decoder may reconstruct the image based on the prediction units and transform coefficients, ultimately outputting a reconstructed picture to a bitstream for transmission. The transmission of reconstructed pictures reduces bit rate required to transmit a video stream and thus achieves rate gains.

Compression efficiency has been further improved by, additionally, subjecting residual coefficients to prediction, coding, and decoding as well. This is implemented in the form of the entropy coder Context-Sensitive Binary Arithmetic Codec ("CABAC"). However, due to challenges understood by persons skilled in the art, conventionally the signs of each residual coefficient have not been subject to prediction or coding, rather being transmitted as "sign bits"; these bits continue to make up a substantial portion of the transmitted bitstream, and thus remain a target of ongoing efforts to achieve further bit rate gains.

At time of writing, the latest draft of ECM (presented at the 136th meeting of the Moving Picture Experts Group ("MPEG") in October 2021 as "Algorithm description of Enhanced Compression Model 3 (ECM 3 )") includes a proposal to subject residual coefficient signs to prediction, coding, and decoding. However, it is desired to continue to refine sign prediction proposals to achieve even greater bit rate gains and compression efficiency in video coding, and so that the resulting bit rate gain is not greatly offset by loss in prediction accuracy.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 8A, 8B, 8C, 8D, 8E, and 8F illustrate an example residual border prediction of a TB according to a diagonal-right mode of the present disclosure.

FIGS. 9A, 9B, 9C, 9D, 9E, and 9F illustrate an example residual border prediction of a TB according to a diagonal-left mode of the present disclosure.

FIGS. 10A, 10B, 10C, 10D, 10E, and 10F illustrate an example residual border prediction of a TB according to a first mixed mode of the present disclosure.

FIGS. 11A, 11B, 11C, 11D, 11E, and 11F illustrate an example residual border prediction of a TB according to a second mixed mode of the present disclosure.

FIGS. 12A, 12B, 12C, 12D, 12E, and 12F illustrate examples of residual border prediction of a TB according to a third mixed mode of the present disclosure.

FIGS. 13A, 13B, 13C, 13D, 13E, and 13F illustrate examples of residual border prediction of a TB according to a fourth mixed mode of the present disclosure.

FIGS. 14A, 14B, 14C, 14D, 14E, and 14F illustrate examples of residual border prediction of a TB according to a fifth mixed mode of the present disclosure.

FIGS. 15A, 15B, 15C, 15D, 15E, and 15F illustrate examples of residual border prediction of a TB according to a sixth mixed mode of the present disclosure.

DETAILED DESCRIPTION

In accordance with the VVC video coding standard (the "VVC standard") and motion prediction as described therein, computer-readable instructions stored on a computer-readable storage medium are executable by one or more processors of a computing system to configure the one or more processors to perform operations of an encoder as described by the VVC standard, and operations of a decoder as described by the VVC standard. Some of these encoder operations and decoder operations according to the VVC standard are subsequently described in further detail, though these subsequent descriptions should not be understood as exhaustive of encoder operations and decoder operations according to the VVC standard. Subsequently, a "VVC-standard encoder" and a "VVC-standard decoder" shall describe the respective computer-readable instructions stored on a computer-readable storage medium which configure one or more processors to perform these respective operations (which can be called, by way of example, "reference implementations" of an encoder or a decoder).

Moreover, according to example embodiments of the present disclosure, a VVC-standard encoder and a VVC-standard decoder further include computer-readable instructions stored on a computer-readable storage medium which are executable by one or more processors of a computing system to configure the one or more processors to perform operations not specified by the VVC standard. A VVC-standard encoder should not be understood as limited to operations of a reference implementation of an encoder, but including further computer-readable instructions configuring one or more processors of a computing system to perform further operations as described herein. A VVC-standard decoder should not be understood as limited to operations of a reference implementation of a decoder, but including further computer-readable instructions configuring one or more processors of a computing system to perform further operations as described herein.

Figure 1A:
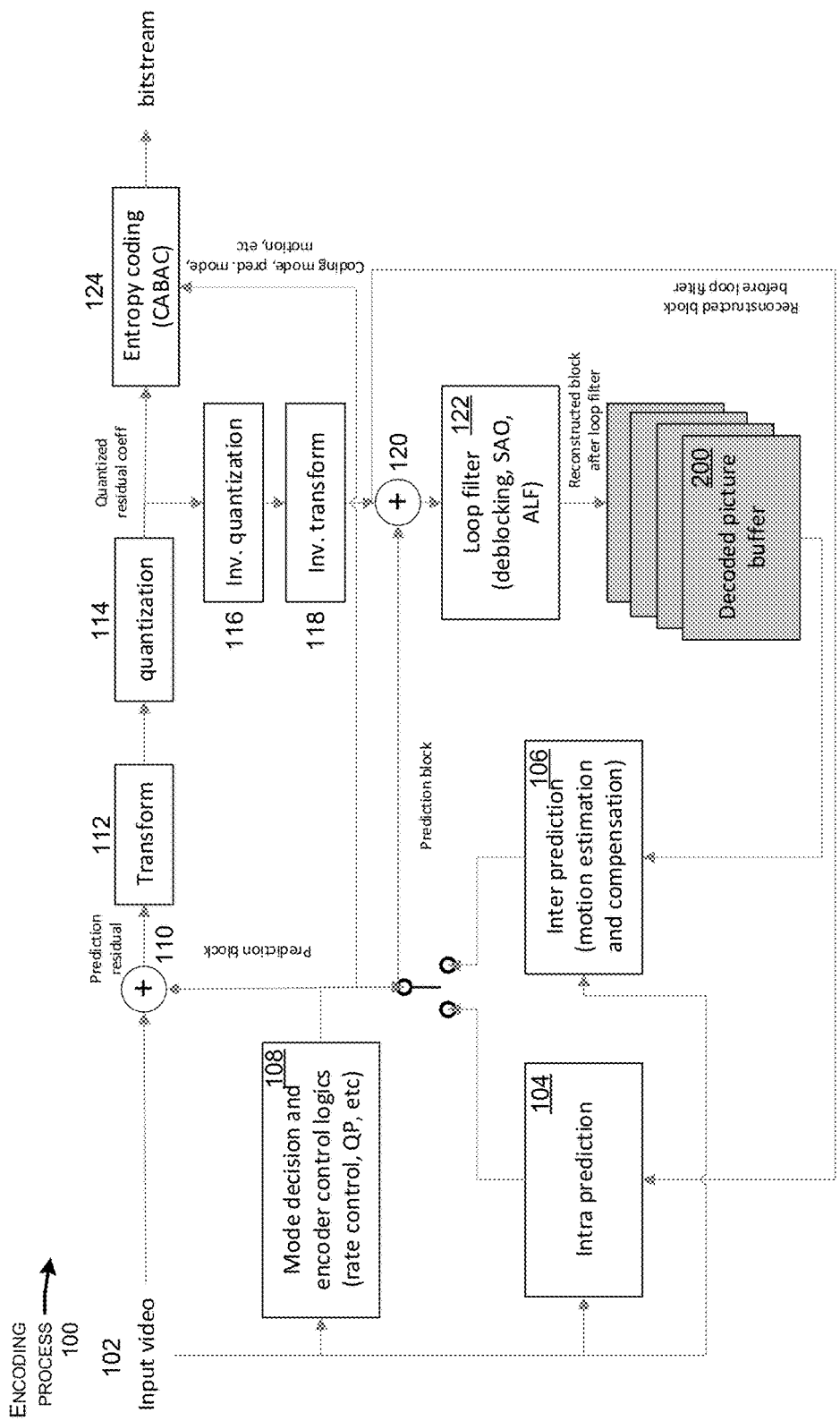
FIGS. 1A and 1B illustrate example block diagrams of, respectively, a video encoding process and a video decoding process according to example embodiments of the present disclosure.
Figure 1B:
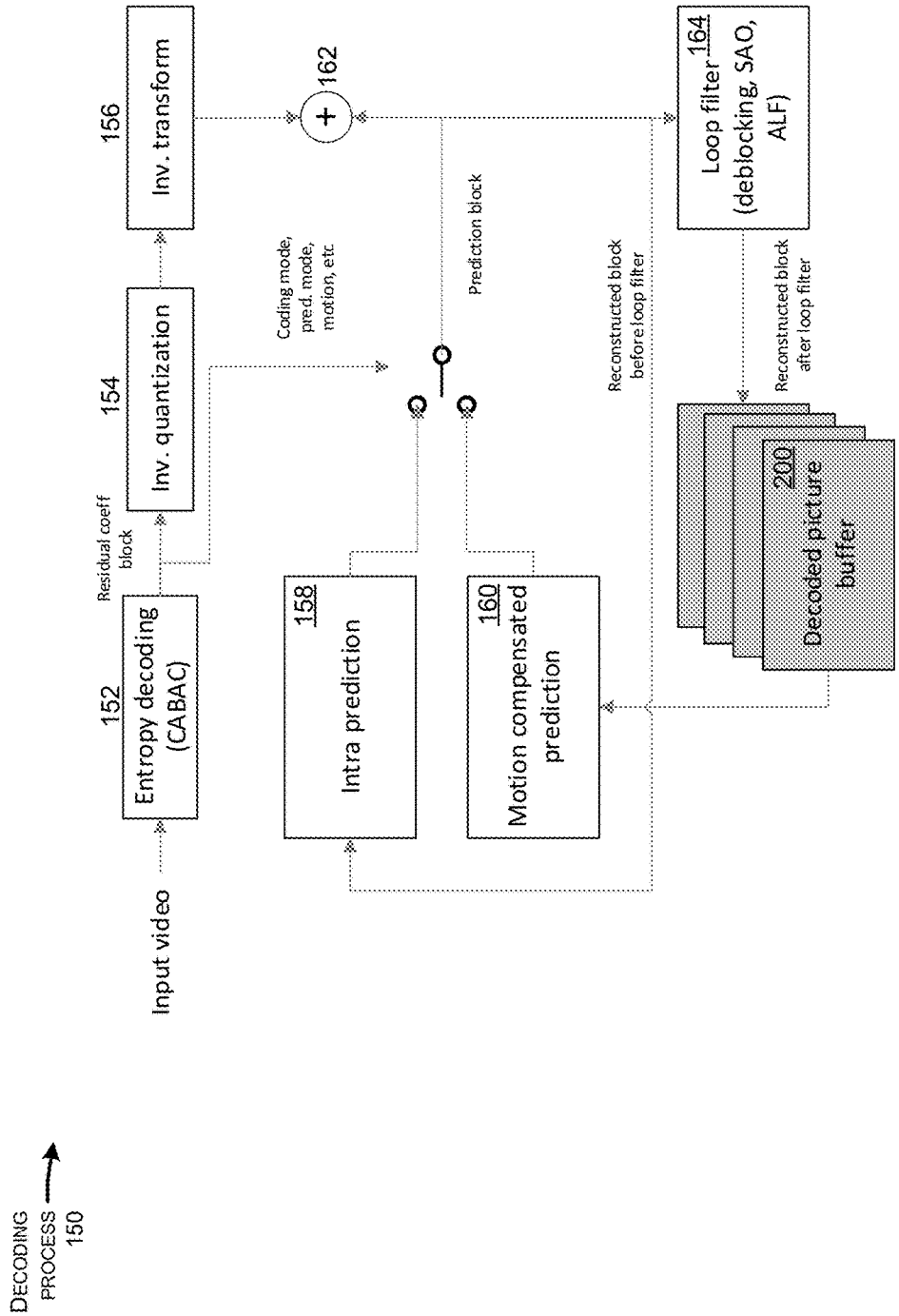

FIGS. 1A and 1B illustrate example block diagrams of, respectively, an encoding process 100 and a decoding process 150 according to an example embodiment of the present disclosure.

In an encoding process 100, a VVC-standard encoder configures one or more processors of a computing system to receive, as input, one or more input pictures from an image source 102. An input picture includes some number of pixels sampled by an image capture device, such as a photosensor array, and includes an uncompressed stream of multiple color channels (such as RGB color channels) storing color data at an original resolution of the picture, where each channel stores color data of each pixel of a picture using some number of bits. A VVC-standard encoder configures one or more processors of a computing system to store this uncompressed color data in a compressed format, wherein color data is stored at a lower resolution than the original resolution of the picture, encoded as a luma ("Y") channel and two chroma ("U" and "V") channels of lower resolution than the luma channel.

A VVC-standard encoder encodes a picture (a picture being encoded being called a "current picture," as distinguished from any other picture received from an image source 102) by configuring one or more processors of a computing system to partition the original picture into units and subunits according to a partitioning structure. A VVC-standard encoder configures one or more processors of a computing system to subdivide a picture into macroblocks ("MBs") each having dimensions of 16×16 pixels, which may be further subdivided into partitions. A VVC-standard encoder configures one or more processors of a computing system to subdivide a picture into coding tree units ("CTUs"), the luma and chroma components of which may be further subdivided into coding tree blocks ("CTBs") which are further subdivided into coding units ("CUs"). Alternatively, a VVC-standard encoder configures one or more processors of a computing system subdivide a picture into units of N×N pixels, which may then be further subdivided into subunits. Each of these largest subdivided units of a picture may generally be referred to as a "block" for the purpose of this disclosure.

A CU is coded using one block of luma samples and two corresponding blocks of chroma samples, where pictures are not monochrome and are coded using one coding tree.

A VVC-standard encoder configures one or more processors of a computing system to subdivide a block into partitions having dimensions in multiples of 4×4 pixels. For example, a partition of a block may have dimensions of 8×4 pixels, 4×8 pixels, 8×8 pixels, 16×8 pixels, or 8×16 pixels.

By encoding color information of blocks of a picture and subdivisions thereof, rather than color information of pixels of a full-resolution original picture, a VVC-standard encoder configures one or more processors of a computing system to encode color information of a picture at a lower resolution than the input picture, storing the color information in fewer bits than the input picture.

Furthermore, a VVC-standard encoder encodes a picture by configuring one or more processors of a computing system to perform motion prediction upon blocks of a current picture. Motion prediction coding refers to storing image data of a block of a current picture (where the block of the original picture, before coding, is referred to as an "input block") using motion information and prediction units ("PUs"), rather than pixel data, according to intra prediction 104 or inter prediction 106.

Motion information refers to data describing motion of a block structure of a picture or a unit or subunit thereof, such as motion vectors and references to blocks of a current picture or of a reference picture. PUs may refer to a unit or multiple subunits corresponding to a block structure among multiple block structures of a picture, such as an MB or a CTU, wherein blocks are partitioned based on the picture data and are coded according to the VVC standard. Motion information corresponding to a PU may describe motion prediction as encoded by a VVC-standard encoder as described herein.

A VVC-standard encoder configures one or more processors of a computing system to code motion prediction information over each block of a picture in a coding order among blocks, such as a raster scanning order wherein a first-decoded block is an uppermost and leftmost block of the picture. A block being encoded is called a "current block," as distinguished from any other block of a same picture.

According to intra prediction 104, one or more processors of a computing system are configured to encode a block by references to motion information and PUs of one or more other blocks of the same picture. According to intra prediction coding, one or more processors of a computing system perform an intra prediction 104 (also called spatial prediction) computation by coding motion information of the current block based on spatially neighboring samples from spatially neighboring blocks of the current block.

According to inter prediction 106, one or more processors of a computing system are configured to encode a block by references to motion information and PUs of one or more other pictures. One or more processors of a computing system are configured to store one or more previously coded and decoded pictures in a reference picture buffer for the purpose of inter prediction coding; these stored pictures are called reference pictures.

One or more processors are configured to perform an inter prediction 106 (also called temporal prediction or motion compensated prediction) computation by coding motion information of the current block based on samples from one or more reference pictures. Inter prediction may further be computed according to uni-prediction or bi-prediction: in uni-prediction, only one motion vector, pointing to one reference picture, is used to generate a prediction signal for the current block. In bi-prediction, two motion vectors, each pointing to a respective reference picture, are used to generate a prediction signal of the current block.

A VVC-standard encoder configures one or more processors of a computing system to code a CU to include reference indices to identify, for reference of a VVC-standard decoder, the prediction signal(s) of the current block. One or more processors of a computing system can code a CU to include an inter prediction indicator. An inter prediction indicator indicates list 0 prediction in reference to a first reference picture list referred to as list 0, list 1 prediction in reference to a second reference picture list referred to as list 1, or bi-prediction in reference to both reference picture lists referred to as, respectively, list 0 and list 1.

In the cases of the inter prediction indicator indicating list 0 prediction or list 1 prediction, one or more processors of a computing system are configured to code a CU including a reference index referring to a reference picture of the reference picture buffer referenced by list 0 or by list 1, respectively. In the case of the inter prediction indicator indicating bi-prediction, one or more processors of a computing system are configured to code a CU including a first reference index referring to a first reference picture of the reference picture buffer referenced by list 0, and a second reference index referring to a second reference picture of the reference picture referenced by list 1.

A VVC-standard encoder configures one or more processors of a computing system to code each current block of a picture individually, outputting a prediction block for each. According to the VVC standard, a CTU can be as large as 128×128 luma samples (plus the corresponding chroma samples, depending on the chroma format). A CTU may be further partitioned into CUs according to a quad-tree, binary tree, or ternary tree. One or more processors of a computing system are configured to ultimately record coding parameter sets such as coding mode (intra mode or inter mode), motion information (reference index, motion vectors, etc.) for inter-coded blocks, and quantized residual coefficients, at syntax structures of leaf nodes of the partitioning structure.

After a prediction block is output, a VVC-standard encoder configures one or more processors of a computing system to send coding parameter sets such as coding mode (i.e., intra or inter prediction), a mode of intra prediction or a mode of inter prediction, and motion information to an entropy coder 124 (as described subsequently).

The VVC standard provides semantics for recording coding parameter sets for a CU. For example, with regard to the above-mentioned coding parameter sets, pred_mode_flag for a CU is set to 0 for an inter-coded block, and is set to 1 for an intra-coded block; general_merge_flag for a CU is set to indicate whether merge mode is used in inter prediction of the CU; inter_affine_flag and cu_affine_type_flag for a CU are set to indicate whether affine motion compensation is used in inter prediction of the CU; mvp_l0flag and mvp_l1_flag are set to indicate a motion vector index in list 0 or in list 1, respectively; and ref_idx_l0 and ref_idx_l1 are set to indicate a reference picture index in list 0 or in list 1, respectively. It should be understood that the VVC standard includes semantics for recording various other information, flags, and options which are beyond the scope of the present disclosure.

A VVC-standard encoder further implements one or more mode decision and encoder control settings 108, including rate control settings. One or more processors of a computing system are configured to perform mode decision by, after intra or inter prediction, selecting an optimized prediction mode for the current block, based on the rate-distortion optimization method.

A rate control setting configures one or more processors of a computing system to assign different quantization parameters ("QPs") to different pictures. Magnitude of a QP determines a scale over which picture information is quantized during encoding by one or more processors (as shall be subsequently described), and thus determines an extent to which the encoding process 100 discards picture information (due to information falling between steps of the scale) from MBs of the sequence during coding.

A VVC-standard encoder further implements a subtractor 110. One or more processors of a computing system are configured to perform a subtraction operation by computing a difference between an input block and a prediction block. Based on the optimized prediction mode, the prediction block is subtracted from the input block. The difference between the input block and the prediction block is called prediction residual, or "residual" for brevity.

Based on a prediction residual, a VVC-standard encoder further implements a transform 112. One or more processors of a computing system are configured to perform a transform operation on the residual by a matrix arithmetic operation to derive an array of coefficients (which can be referred to as "residual coefficients," "transform coefficients," and the like), thereby encoding a current block as a transform block ("TB"). Transform coefficients may refer to coefficients representing one of several spatial transformations, such as a diagonal flip, a vertical flip, or a rotation, which may be applied to a sub-block.

It should be understood that a coefficient can be stored as two components, an absolute value and a sign, as shall be described in further detail subsequently.

Sub-blocks of CUs, such as PUs and TBs, can be arranged in any combination of sub-block dimensions as described above. A VVC-standard encoder configures one or more processors of a computing system to subdivide a CU into a residual quadtree ("RQT"), a hierarchical structure of TBs.

The RQT provides an order for motion prediction and residual coding over sub-blocks of each level and recursively down each level of the RQT.

A VVC-standard encoder further implements a quantization 114. One or more processors of a computing system are configured to perform a quantization operation on the residual coefficients by a matrix arithmetic operation, based on a quantization matrix and the QP as assigned above. Residual coefficients falling within an interval are kept, and residual coefficients falling outside the interval step are discarded.

A VVC-standard encoder further implements an inverse quantization 116 and an inverse transform 118. One or more processors of a computing system are configured to perform an inverse quantization operation and an inverse transform operation on the quantized residual coefficients, by matrix arithmetic operations which are the inverse of the quantization operation and transform operation as described above. The inverse quantization operation and the inverse transform operation yield a reconstructed residual.

A VVC-standard encoder further implements an adder 120. One or more processors of a computing system are configured perform an addition operation by adding a prediction block and a reconstructed residual, outputting a reconstructed block.

A VVC-standard encoder further implements a loop filter 122. One or more processors of a computing system are configured to apply a loop filter, such as a deblocking filter, a sample adaptive offset ("SAO") filter, and adaptive loop filter ("ALF") to a reconstructed block, outputting a filtered reconstructed block.

A VVC-standard encoder further configures one or more processors of a computing system to output a filtered reconstructed block to a decoded picture buffer ("DPB") 200. A DPB 200 stores reconstructed pictures which are used by one or more processors of a computing system as reference pictures in coding pictures other than the current picture, as described above with reference to inter prediction.

A VVC-standard encoder further implements an entropy coder 124. One or more processors of a computing system are configured to perform entropy coding, wherein, according to the Context-Sensitive Binary Arithmetic Codec ("CABAC"), symbols making up quantized residual coefficients are coded by mappings to binary strings (subsequently "bins"), which can be transmitted in an output bitstream at a compressed bitrate. The symbols of the quantized residual coefficients which are coded include absolute values of the residual coefficients (these absolute values being subsequently referred to as "residual coefficient levels").

However, although residual coefficient levels are predicted and coded, residual coefficient signs are signaled using bins indicating equiprobable (subsequently "EP") states (it should be understood that coefficients having value 0 have no sign and therefore need not be signaled). A VVC-standard encoder does not configure one or more processors of a computing system to predict residual coefficient signs, due to computational challenges (which will be appreciated by persons skilled in the art, but need not be reiterated herein for understanding example embodiments of the present disclosure). For these reasons, CABAC configures one or more processors of a computing system to bypass the coding of residual coefficient signs, resulting in added transmission of 1 bit per sign in an output bitstream.

Thus, the entropy coder configures one or more processors of a computing system to code residual coefficient levels of a block; bypass coding of residual coefficient signs and record the residual coefficient signs with the coded block; record coding parameter sets such as coding mode, a mode of intra prediction or a mode of inter prediction, and motion information coded in syntax structures of a coded block (such as a picture parameter set ("PPS") found in a picture header, as well as a sequence parameter set ("SPS") found in a sequence of multiple pictures); and output the coded block.

A VVC-standard encoder configures one or more processors of a computing system to output a coded picture, made up of coded blocks from the entropy coder 124. The coded picture is output to a transmission buffer, where it is ultimately packed into a bitstream for output from the VVC-standard encoder.

In a decoding process 150, a VVC-standard decoder configures one or more processors of a computing system to receive, as input, one or more coded pictures from a bitstream.

A VVC-standard decoder implements an entropy decoder 152. One or more processors of a computing system are configured to perform entropy decoding, wherein, according to CABAC, bins are decoded by reversing the mappings of symbols to bins, thereby recovering the entropy-coded quantized residual coefficients. The entropy decoder 152 outputs the quantized residual coefficients, outputs the coding-by-passed residual coefficient signs, and also outputs the syntax structures such as a PPS and a SPS.

A VVC-standard decoder further implements an inverse quantization 154 and an inverse transform 156. One or more processors of a computing system are configured to perform an inverse quantization operation and an inverse transform operation on the decoded quantized residual coefficients, by matrix arithmetic operations which are the inverse of the quantization operation and transform operation as described above. The inverse quantization operation and the inverse transform operation yield a reconstructed residual.

Furthermore, based on coding parameter sets recorded in syntax structures such as PPS and a SPS by the entropy coder 124 (or, alternatively, received by out-of-band transmission or coded into the decoder), and a coding mode included in the coding parameter sets, the VVC-standard decoder determines whether to apply intra prediction 156 (i.e., spatial prediction) or to apply motion compensated prediction 158 (i.e., temporal prediction) to the reconstructed residual.

In the event that the coding parameter sets specify intra prediction, the VVC-standard decoder configures one or more processors of a computing system to perform intra prediction 158 using prediction information specified in the coding parameter sets. The intra prediction 158 thereby generates a prediction signal.

In the event that the coding parameter sets specify inter prediction, the VVC-standard decoder configures one or more processors of a computing system to perform motion compensated prediction 160 using a reference picture from a DPB 200. The motion compensated prediction 160 thereby generates a prediction signal.

A VVC-standard decoder further implements an adder 162. The adder 162 configures one or more processors of a computing system to perform an addition operation on the reconstructed residuals and the prediction signal, thereby outputting a reconstructed block.

A VVC-standard decoder further implements a loop filter 164. One or more processors of a computing system are configured to apply a loop filter, such as a deblocking filter, a SAO filter, and ALF to a reconstructed block, outputting a filtered reconstructed block.

A VVC-standard decoder further configures one or more processors of a computing system to output a filtered reconstructed block to the DBP 200. As described above, a DPB 200 stores reconstructed pictures which are used by one or more processors of a computing system as reference pictures in coding pictures other than the current picture, as described above with reference to motion compensated prediction.

A VVC-standard decoder further configures one or more processors of a computing system to output reconstructed pictures from the DPB to a user-viewable display of a computing system, such as a television display, a personal computing monitor, a smartphone display, or a tablet display.

Therefore, as illustrated by an encoding process 100 and a decoding process 150 as described above, a VVC-standard encoder and a VVC-standard decoder each implements motion prediction coding in accordance with the VVC specification. A VVC-standard encoder and a VVC-standard decoder each configures one or more processors of a computing system to generate a reconstructed picture based on a previous reconstructed picture of a DPB according to motion compensated prediction as described by the VVC standard, wherein the previous reconstructed picture serves as a reference picture in motion compensated prediction as described herein.

As described above, as coded blocks are transmitted in a bitstream, a substantial portion of the transmission bitrate is consumed by transmitting residual coefficient signs, where each sign is signaled by one bit (these bits subsequently referred to as "sign bits"); the VVC standard does not provide techniques to further compress these sign bits to achieve further compression. The JVET's continuing work to develop compression techniques beyond the scope of the VVC specification (presented at the 136th meeting of the Moving Picture Experts Group ("MPEG") in October 2021 as "Algorithm description of Enhanced Compression Model 3 (ECM 3)") proposes to replace this behavior, by subjecting residual coefficient signs (subsequently "signs," for brevity) to prediction and coding as well (subsequently referred to as "residual sign prediction" techniques or "sign prediction" techniques, to be described in further detail).

ECM 3 proposes residual sign prediction techniques based on high correlation between signs frequently occurring across boundaries of neighboring TBs (this correlation remaining after a transformation operation). The ECM 3 proposal provides a VVC-standard encoder and a VVC-standard decoder predicting signs at rows and columns of TBs neighboring other blocks, potentially saving bits in coding each individual TB because neighboring TBs contain redundant information. Furthermore, within a TB, regardless of its size, only signs within an uppermost and leftmost 4×4 region of the TB are predicted (so that the VVC-standard encoder and the VVC-standard decoder may use neighboring reconstructed blocks for predictions, as shall be described subsequently); other signs of the same TB are still signaled by EP bins.

For the purpose of understanding example embodiments of the present disclosure, the ECM 3 residual sign prediction proposals are described subsequently in further detail.

Figure 2:
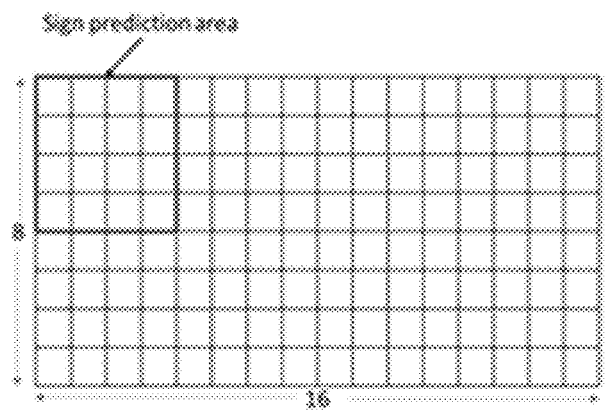
FIG. 2 illustrates a 4×4 region of a TU which is 16×8 pixels in size according to the ECM 3 proposal.

FIG. 2 illustrates a 4×4 region of a TB which is 16×8 pixels in size; according to the ECM 3 proposal, residual sign prediction techniques only predict signs within this region.

Moreover, according to ECM 3's residual sign prediction, for each TB, no more than a maximum number of signs may be predicted. Assume the maximum number of signs to be predicted is represented by a variable maxNumPredSigns.

The value of maxNumPredSigns is signaled to the decoder through SPS. The allowable value of maxNumPredSigns in ECM 3 is 0 to 8, inclusive. If the value of maxNumPredSigns is 0, the sign prediction method is disabled for that sequence. If the maxNumPredSigns is equal to 8, the maximum of 8 signs is predicted for a TB. If the number of signs of an upper-left 4×4 region is larger than the maximum allowed value (maxNumPredSigns), only the first maxNumPredSigns signs determined in a raster scan order are predicted, as described subsequently.

Figure 3:
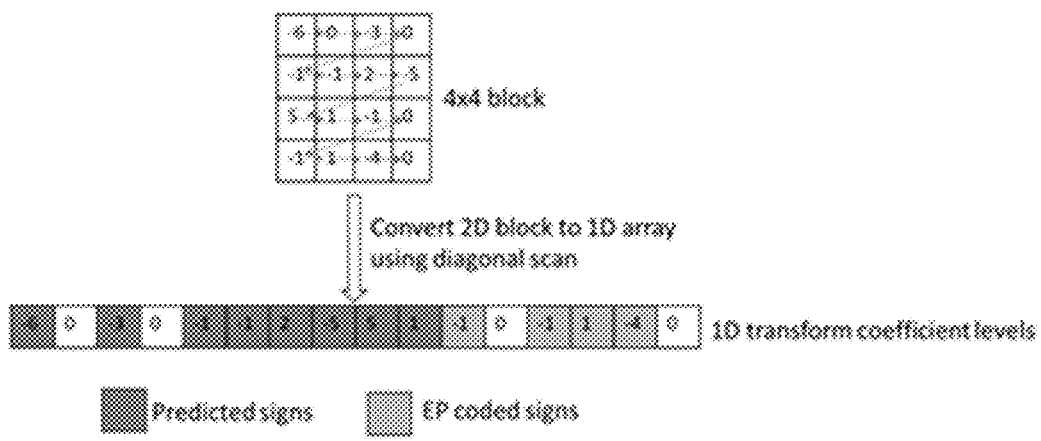
FIG. 3 illustrates scanning order of a 4×4 region of a TU to determine signs to be predicted according to the ECM 3 proposal.

FIG. 3 illustrates scanning order of an uppermost and leftmost 4×4 region of a TB to determine signs to be predicted according to the ECM 3 proposal. The 4×4 region of the TB is first converted to one-dimensional array by scanning the residual coefficients in raster scanning order; within the array, the first n signs (in raster scanning order) are predicted. As FIG. 3 illustrates, the first 8 (assume maxNumPredSigns=8) signs in raster scanning order are predicted and subsequently coded, and the remaining subsequent signs are signed in CABAC bypass mode as EP bins. In this fashion, some signs are predicted and coded, rather than signaled, thereby saving sign bits in transmission. It should be understood that coefficients having value of 0 have no sign and therefore need not be predicted or signaled.

Each sign is either positive or negative; therefore, for n signs to be predicted, $2^n$ possible combinations of sign values exist. A VVC-standard encoder and a VVC-standard decoder implemented according to ECM 3 can therefore each reconstruct the predicted signs by performing $2^n$ simplified residual border reconstructions (and capping n at a small value therefore prevents high computational complexity from arising). Border residuals are predicted from the neighboring reconstructed blocks and a current block undergoing prediction in the decoding process; since blocks are decoded and reconstructed in raster scanning order, an upper neighboring block and a left neighboring block are already previously decoded and reconstructed before the current block is decoded, and the reconstructed pixels of those neighboring blocks are available for both the VVC-standard encoder and the VVC-standard decoder.

For a particular border reconstruction, only the leftmost and topmost residual values of the block are recreated from the dequantization followed by inverse transformation. The residual border reconstruction of each combination of sign values is called a hypothesis. If n denotes the number of signs to be predicted, then the number of hypotheses is $2^n$ and the border residual reconstruction is performed $2^n$ times.

Figure 4A:
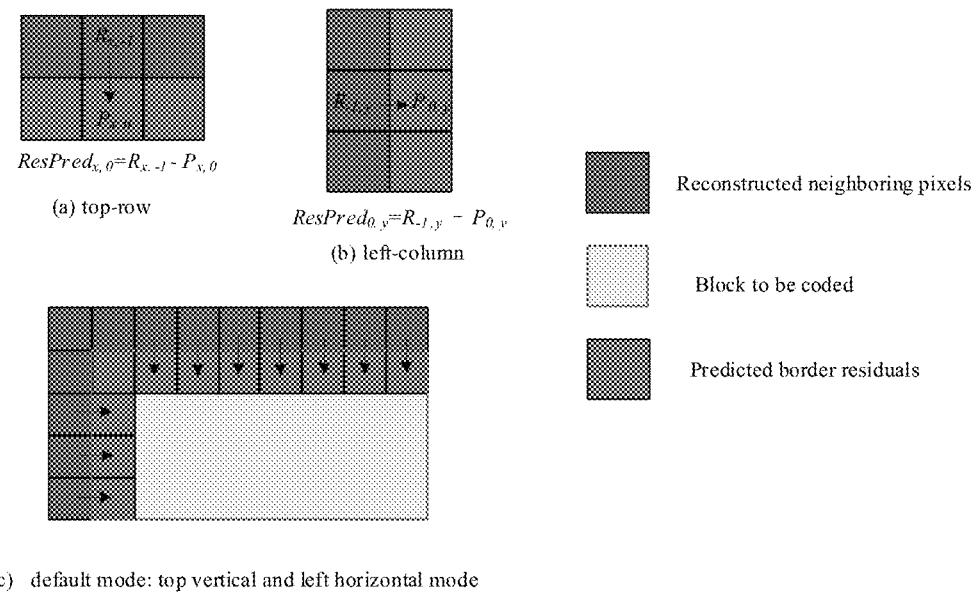
FIGS. 4A and 4B illustrate examples of residual border prediction of an 8×4 TU according to the ECM 3 proposal.
Figure 4B:
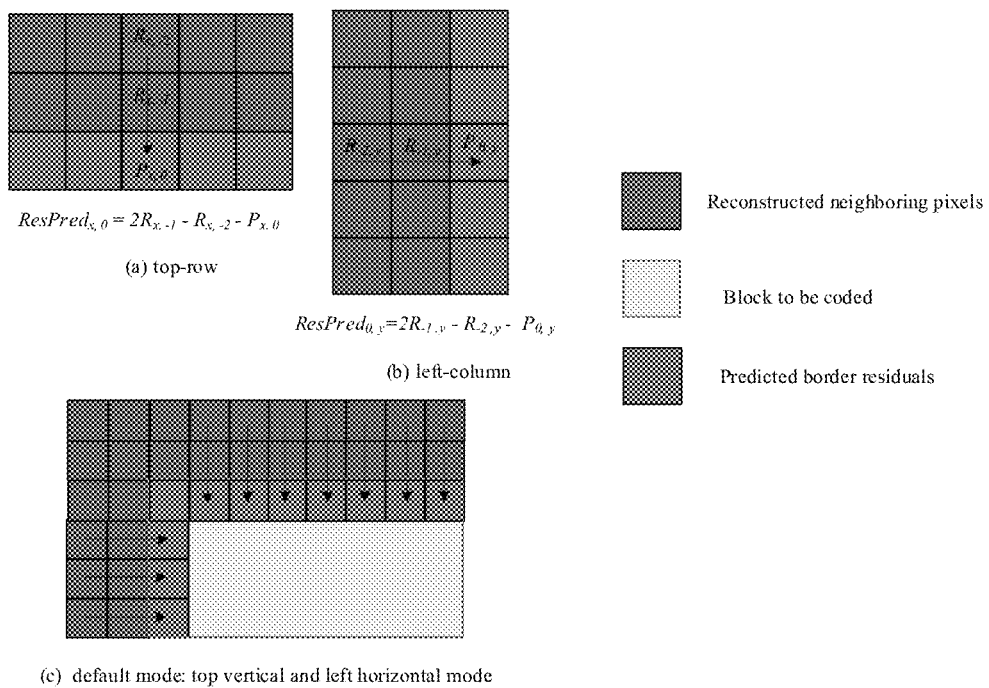

FIGS. 4A and 4B illustrate examples of residual border prediction of an 8×4 TB according to the ECM 3 proposal. The top-row residuals of the border are predicted from the first above row (as illustrated in FIG. 4A) or the first two above rows (as illustrated in FIG. 4B) of the reconstructed neighbors and left column residuals are predicted from the first column leftward (as illustrated in FIG. 4A) or the first two columns leftward of the reconstructed neighbors. Herein, (0, 0) denotes the upper-left position of a TB for which signs are to be predicted. According to FIG. 4A, the border residual of the upper-row and left-columns is predicted as follows:

$$\text{ResPred}_{x,0} = R_{x,-1} 31\, P_{x,0}$$

$$\text{ResPred}_{0,y} = R_{-1,y} - P_{0,y}$$

According to FIG. 4B, the border residual of the upper-row and left-columns is predicted as follows:

$$\text{ResPred}_{x,0} = -R_{x,-2} + 2R_{x,-1} - P_{x,0}$$

$$\text{ResPred}_{0,y} = -R_{-2,y} {}^\circ 2R_{-1,y} - P_{0,y}$$

Herein, $ResPred_{x,y}$ denotes the predicted border residuals (shown shaded dark in FIGS. 4A and 4B) of position (x, y) of the TB. $R_{x,y}$ denotes the reconstructed pixel of the neighboring blocks with position (x, y), and $P_{x,y}$ denotes the predicted signal of the current block at position (x, y).

Figure 5:
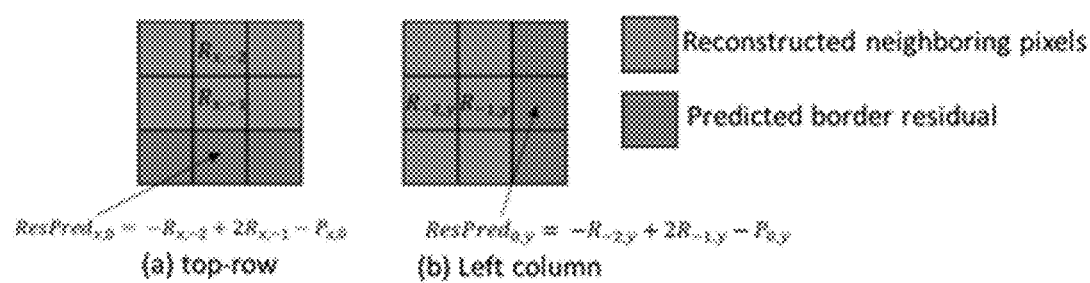
FIG. 5 illustrates predicted border residuals derived according to the ECM 3 proposal.

FIG. 5 illustrates predicted border residuals derived from the above equations according to the ECM 3 proposal as illustrated in FIG. 4B. At the uppermost row of the TB, a predicted border residual is determined based on two reconstructed neighboring pixels respectively one and two pixels vertically offset. At the leftmost row of the TB, a predicted border residual is determined based on two reconstructed neighboring pixels respectively one and two pixels horizontally offset.

Upon determining $2^n$ hypotheses and determining predicted border residuals, the encoder and the decoder may test each hypothesis against the predicted border residuals to determine which hypothesis minimizes a cost function. The cost function herein is configured to yield a higher cost for higher discontinuity between neighboring blocks. The cost function is defined as a sum of absolute differences ("SAD") between predicted residuals and reconstructed residuals of the hypothesis, as follows:

$$cost = \Sigma_{x=o}^{w}|ResPred_{x,0} - ResRec_{x,0}| + \Sigma_{y=o}^{h}|ResPred_{0,y} - ResRec_{0,y}|$$

Herein, $ResPred_{x,y}$ is as defined above, still according to (0, 0) denoting the upper-left position of a TB for which signs are to be predicted; $ResRec_{x,y}$ is each reconstructed candidate residual of a hypothesis, among the $2^n$ hypotheses, at position (x, y); and w and h are the width and height of the TB.

To derive each predicted sign, the encoder and the decoder evaluate the above cost function for each hypothesis (i.e., candidates), and the hypothesis yielding the smallest cost is selected as a predictor for the sign.

Finally, according to ECM 3's residual sign prediction, a sign that has been predicted is no longer EP signaled in the bitstream, but is replaced by a "residue" (signaled using an associated CABAC context) which indicates if the prediction was correct or not. In this disclosure, the variable errSignPred is used to define the "residue" of a sign. The value of errSignPred equal to 0 indicates the predicted sign is same as the actual sign and the value of errSignPred equal to 1 indicates that the predicted sign is different than the actual sign.

Furthermore, it should be understood that the VVC-standard encoder and the VVC-standard decoder predict each sign among n signs to be predicted one by one, in turn referencing errSignPred values for earlier predictions in making later predictions. According to ECM 3, the predicted signs are the first n signs of a block in raster scanning order (as shall be elaborated upon subsequently with reference to FIG. 21).

For a first predicted sign, the VVC-standard encoder and the VVC-standard decoder do not have any previous errSignPred values. The VVC-standard encoder and the VVC-standard decoder evaluate the above cost function for each of the $2^n$ hypotheses, select a hypothesis yielding the smallest cost among them, and designate a first sign of that hypothesis as a predictor of a first sign for the current block. Then the errSignPred flag of the first sign is signaled to indicate whether the prediction of the first sign is correct or not.

For a second predicted sign, the VVC-standard encoder and the VVC-standard decoder know the previously determined errSignPred value for the first predicted sign, and therefore can derive the actual value of the first sign; thus, only $2^{n-1}$ hypotheses remain to be evaluated for the remaining n−1 signs. The VVC-standard encoder and the VVC-standard decoder evaluate the above cost function for each of the $2^{n-1}$ hypotheses, select a hypothesis yielding the smallest cost among them, and designate a second sign (i.e., the first sign in the remaining n−1 signs) of that hypothesis as a predictor of a second sign for the current block. Then the errSignPred flag of the second sign is signaled to indicate whether the prediction of the second sign is correct or not.

For a third predicted sign, the VVC-standard encoder and the VVC-standard decoder know the previously determined errSignPred value for the second predicted sign, and therefore can derive the actual value of the second sign alongside the actual value of the first sign; thus, only $2^{n-2}$ hypotheses remain to be evaluated for the remaining n−2 signs. The VVC-standard encoder and the VVC-standard decoder evaluate the above cost function for each the $2^{n-2}$ hypotheses, select a hypothesis yielding the smallest cost among them, and designate a third sign (i.e., the first sign in the remaining n−2 signs) of that hypothesis as a predictor of a third sign for the current block. Then the errSignPred flag of the third sign is signaled to indicate whether the prediction of the third sign is correct or not.

The VVC-standard encoder and the VVC-standard decoder repeat the above-mentioned steps for each subsequent predicted sign until the last predicted sign. For a last predicted sign, the encoder and the decoder know all previously determined errSignPred value for all other predicted signs, and therefore can derive the actual value of the all other signs; thus, only two hypotheses remain to be evaluated for the remaining 1 sign. The encoder and the decoder evaluate the above cost function for both hypotheses, select a hypothesis yielding the smallest cost among them, and designate a last sign (i.e., the remaining sign) of that hypothesis as a predictor of a last sign for the current block. Then the errSignPred flag of the last sign is signaled to indicate whether the prediction of the last sign is correct or not.

However, ECM 3's residual sign prediction, as described above, still suffers from drawbacks. Because border residuals are predicted either from top neighboring reconstructed pixels or from left neighboring reconstructed pixels, if image data of a block contains a visible boundary in any diagonal direction, the prediction may not be accurate. Moreover, performing residual sign prediction based on only the upper-left 4×4 region of a TB remains a limitation, and it is desired to predict more residual coefficient signs in order to achieve greater bit rate gains. Furthermore, the prediction of only the first n signs in raster scanning order is also a limitation, and it is desired to predict more signs without overly increasing computational complexity in turn.

Furthermore, the above-mentioned cost function does not accurately measure real costs of each hypothesis in all cases; for example, when an image contains an object whose edge coincides with the boundary of neighboring TBs, the assumption of high correlation between residual coefficient signs across boundaries of neighboring TBs no longer holds, and the assumption that neighboring TBs contain redundant information no longer holds.

Therefore, example embodiments of the present disclosure provide a residual sign prediction method which provides improvements over ECM 3 in a number of regards.

In one or more aspects, example embodiments of the present disclosure provide a VVC-standard encoder and a VVC-standard decoder implementing a residual sign prediction method utilizing a gradient-based border residual sign prediction process.

In one or more aspects, example embodiments of the present disclosure provide a VVC-standard encoder and a VVC-standard decoder implementing a residual sign prediction method utilizing multi-modal residual border prediction, and further configuring residual border prediction by signaling; by computation of predicted templates; and by derivation of signaling.

In one or more aspects, example embodiments of the present disclosure provide a VVC-standard encoder and a VVC-standard decoder implementing a residual sign prediction method utilizing multi-modal residual border prediction to perform two-step residual sign prediction.

In one or more aspects, example embodiments of the present disclosure provide a VVC-standard encoder and a VVC-standard decoder implementing a residual sign prediction method utilizing sign prediction over the entirety of a TB or an expanded region of a TB.

In one or more aspects, example embodiments of the present disclosure provide a VVC-standard encoder and a VVC-standard decoder implementing a residual sign prediction method utilizing an expanded maximum number of predicted signs.

In one or more aspects, example embodiments of the present disclosure provide a VVC-standard encoder and a VVC-standard decoder implementing a residual sign prediction method utilizing a sorting order of residual coefficients.

In one or more aspects, example embodiments of the present disclosure provide a VVC-standard encoder and a VVC-standard decoder implementing a residual sign prediction method utilizing a non-raster scanning order.

In one or more aspects, example embodiments of the present disclosure provide a VVC-standard encoder and a VVC-standard decoder implementing a residual sign prediction method utilizing border prediction upon an extended border.

In one or more aspects, example embodiments of the present disclosure provide a VVC-standard encoder and a VVC-standard decoder implementing a residual sign prediction method utilizing an expanded range of residue signaling.

Subsequently, each of the above aspects of example embodiments of the present disclosure is described in further detail.

Figures 6A, 6B:
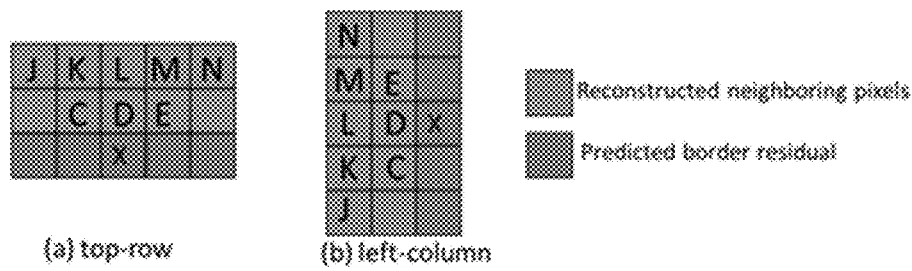
FIGS. 6A and 6B illustrate utilizing a gradient-based border residual sign prediction process in a residual sign prediction method according to example embodiments of the present disclosure.

FIGS. 6A and 6B illustrate utilizing a gradient-based border residual sign prediction process in a residual sign prediction method according to example embodiments of the present disclosure.

According to the ECM 3 proposal, a predicted border residual is determined based on reconstructed neighboring samples which are either vertically offset or horizontally offset. However, in coded video bitstreams, correlations between residual coefficient signs across boundaries of neighboring TBs may occur not just in vertical and horizontal directions, but also in diagonal directions (i.e., when an image contains an object having a visible diagonal boundary spanning neighboring partitioned blocks); ECM 3's residual sign prediction tends to overlook these diagonal correlations.

Thus, as FIGS. 6A and 6B illustrate, according to example embodiments of the present disclosure, a VVC-standard encoder and a VVC-standard decoder each configure one or more processors of a computing system to predict a border residual from the nearest eight reconstructed neighboring samples of the predicted pixel. The cases of the predicted pixel being at an uppermost row of the TB and being at a leftmost column of the TB are both illustrated, with the predicted pixel being labeled as X and its nearest neighbors being labeled as C through E and as J through N.

The predicted residual ResPred is computed by subtracting the prediction (P) from the weighted average of the three neighbors C, D, and E as follows:

$$ResPred = \frac{W_0 \times C + W_1 \times D + W_2 \times E}{W_0 + W_1 + W_2} - P$$

$W_0$, $W_1$, and $W_2$ are the weighting factors and computed as the reciprocal of the gradient values of three directions:

$$W_0 = \frac{1}{Grad_0}, W_1 = \frac{1}{Grad_1}, \text{ and } W_2 = \frac{1}{Grad_2}$$

Figures 7A, 7B, 7C:
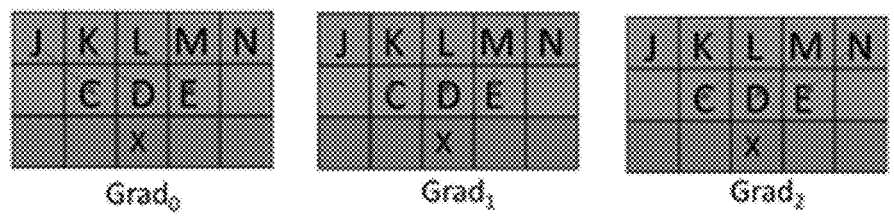
FIGS. 7A, 7B, and 7C illustrate several correlation patterns among the eight nearest neighbors for a predicted pixel at a top row.

It should be understood that given the distribution of the eight nearest neighbors, three common patterns of correlations between residual coefficient signs may be observed: diagonally left to right, diagonally right to left, and either vertical (at a topmost row) or horizontal (at a leftmost column). FIGS. 7A, 7B, and 7C illustrate how these patterns may occur among the eight nearest neighbors for a predicted pixel at a topmost row. The patterns occur similarly in a rotated fashion for a predicted pixel at a leftmost column.

The gradients for the three directions of occurrence are computed as follows:

$Grad_0=(J-C)^2+(K-D)^2+(L-E)^2$ $Grad_1=(K-C)^2+(L-D)^2+(M-E)^2$ $Grad_2=(L-C)^2+(M-D)^2+(N-E)^2$ $Grad_0$ represents a gradient for patterns occurring in the diagonal-right direction, $Grad_1$ represents a gradient for patterns occurring in the vertical direction, and $Grad_2$ represents a gradient for patterns occurring the diagonal-left direction. It is assumed that if the value of $Grad_0$ is lower, the value of predicted pixel X is more similar to neighbors C; if the value of $Grad_1$ is lower, the value of predicted pixel X is more similar to neighbors D; and if the value of $Grad_2$ is lower, the value of predicted pixel X is more similar to neighbors E.

Steps for computing gradients at a predicted pixel along a leftmost column of a TB may be similarly derived from the above description.

According to the ECM 3 proposal, the residual border prediction as described above with reference to FIG. 4A, FIG. 4B, and FIG. 5 is performed uniformly upon all TBs; this method does not result in optimal compression performance for all variety of image content, especially if image data of a block contains pronounced textures and boundaries. Thus, example embodiments of the present disclosure provide multi-modal residual border prediction, in order to improve the accuracy of the residual border prediction method for heterogeneous varieties of image content.

According to example embodiments of the present disclosure, a VVC-standard encoder configures one or more processors of a computing device to check each mode among multiple residual sign prediction modes, select a mode, and signal the selected mode to a VVC-standard decoder. Example embodiments of the present disclosure should not be read as limited to any specific mode and specific number of modes. By way of example, nine sign prediction modes are described subsequently, where the residual border prediction method of ECM 3 as described above is denoted as a "default mode."

Other sign prediction modes, according to example embodiments of the present disclosure, are described as a "diagonal-right mode"; a "diagonal-left mode"; a "first mixed mode" (including both a diagonal-right mode at an uppermost row and a diagonal-left mode at a leftmost column); a "second mixed mode" (including both a diagonal-left mode at an uppermost row and a diagonal-right mode at a leftmost column) ; a "third mixed mode" (including both a default mode at an uppermost row and a diagonal-left mode at a leftmost column); a "fourth mixed mode" (including both a default mode at an uppermost row and a diagonal-right mode at a leftmost column); a "fifth mixed mode" (including both a diagonal-right mode at an uppermost row and a default mode at a leftmost column); and a "sixth mixed mode" (including both a diagonal-left mode at an uppermost row and a default mode at a leftmost column).

FIGS. 8A, 8B, 8C, 8D, 8E, and 8F illustrate an example residual border prediction of a current block 800 (herein, a TB) according to a diagonal-right mode of the present disclosure. As FIGS. 8A, 8B, and 8C illustrate, a VVC-standard encoder according to example embodiments of the present disclosure configures one or more processors of a computing device to select a diagonal-right mode rather than two neighboring rows and two neighboring columns, the uppermost row 802 residuals of the border and the leftmost column 804 residuals are predicted from only first above row 806 and the first leftward column 808 of the reconstructed neighbors. Herein, (0, 0) denotes the upper-left position of a TB for which signs are to be predicted. Each residual of both the uppermost row 802 and the leftmost column 804 is predicted from a different respective reconstructed sample to its upper left, such as, by way of example, as follows:

$$\text{ResPred}_{x,0} = R_{x-1,-1} - P_{x,0}$$

$$\text{ResPred}_{0,y} = R_{-1,y-1} - P_{0,y}$$

However, as FIGS. 8D, 8E, and 8F illustrate, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of both the uppermost row 802 and the leftmost column 804 is predicted from two different respective reconstructed sample pixels to its upper left, such as, by way of example, as follows:

$$\text{ResPred}_{x,0} = 2R_{x-1,-1} - R_{x-2,-2} - P_{x,0}$$

$$\text{ResPred}_{0,y} = 2R_{-1,y-1} - R_{-2,y-2} - P_{0,y}$$

Herein (as described above and repeated here for ease of reference), $\text{ResPred}_{x,y}$ denotes the predicted border residuals (shown shaded dark in FIGS. 8A, 8B, 8C, 8D, 8E, and 8F) of position (x, y) of the TB. $R_{x,y}$ denotes the reconstructed pixel of the neighboring blocks with position (x, y), and $P_{x,y}$ denotes the predicted signal of the current block at position (x, y).

FIGS. 9A, 9B, 9C, 9D, 9E, and 9F illustrate examples of residual border prediction of a current block 800 (herein, a TB) according to a diagonal-left mode of the present disclosure. As in FIGS. 8A, 8B, and 8C, in FIGS. 9A, 9B, and 9C, the uppermost row 802 residuals of the border and the leftmost column 804 residuals are predicted from the first above row 806 and the first leftward column 808 of the reconstructed neighbors. Herein, (0, 0) denotes the upper-left position of a TB for which signs are to be predicted. Each residual of the uppermost row 802 is predicted from a different respective reconstructed sample to its upper right, while each residual of the leftmost column 804 is predicted from a different respective reconstructed sample to its lower left, such as, by way of example, as follows:

$$\text{ResPred}_{x,0} = R_{x+1,-1} - P_{x,0}$$

$$\text{ResPred}_{0,y} = R_{-1,y+1} - P_{0,y}$$

However, as in FIGS. 8D, 8E, and 8F, in FIGS. 9D, 9E, and 9F, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row 802 is predicted from two different respective reconstructed sample pixels to its upper right, while each residual of the leftmost column 804 is predicted from two different respective reconstructed sample pixels to its lower left, such as, by way of example, as follows:

$$\text{ResPred}_{x,0} = 2R_{x+1,-1} - R_{x+2,-2} - P_{x,0}$$

$$\text{ResPred}_{0,y} = 2R_{-1,y+1} - R_{-2,y+2} - P_{0,y}$$

Herein (as described above and repeated here for ease of reference), $\text{ResPred}_{x,y}$ denotes the predicted border residuals (shown shaded dark in FIGS. 9A, 9B, 9C, 9D, 9E, and 9F) of position (x, y) of the TB. $R_{x,y}$ denotes the reconstructed pixel of the neighboring blocks with position (x, y), and $P_{x,y}$ denotes the predicted signal of the current block at position (x, y).

FIGS. 10A, 10B, 10C, 10D, 10E, and 10F illustrate examples of residual border prediction of a current block 800 (herein, a TB) according to a first mixed mode of the present disclosure. As in FIGS. 8A, 8B, 8C, 9A, 9B, and 9C, in FIGS. 10A, 10B, and 10C, the uppermost row 802 residuals of the border and the leftmost column 804 residuals are predicted from the first above row 806 and the first leftward column 808 of the reconstructed neighbors. Herein, (0, 0) denotes the upper-left position of a TB for which signs are to be predicted. Each residual of the uppermost row 802 is predicted from a different respective reconstructed sample to its upper left, while each residual of the leftmost column 804 is predicted from a different respective reconstructed sample to its lower left, such as, by way of example, as follows:

$$\text{ResPred}_{x,0} = R_{x-1,-1} - P_{x,0}$$

$$\text{ResPred}_{0,y} = R_{-1,y+1} - P_{0,y}$$

However, as in FIGS. 8D, 8E, 8F, 9D, 9E, and 9F, in FIGS. 10D, 10E, and 10F, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row 802 is predicted from two different respective reconstructed sample pixels to its upper left, while each residual of the leftmost column 804 is predicted from two different respective reconstructed sample pixels to its lower left, as follows:

$$\text{ResPred}_{x,0} = 2R_{x-1,-1} - R_{x-2,-2} - P_{x,0}$$

$$\text{ResPred}_{0,y} = 2R_{-1,y+1} - R_{-2,y+2} - P_{0,y}$$

Herein (as described above and repeated here for ease of reference), ResPred$_{x,y}$ denotes the predicted border residuals (shown shaded dark in FIGS. 10A, 10B, 10C, 10D, 10E, and 10F) of position (x, y) of the TB. $R_{x,y}$ denotes the reconstructed pixel of the neighboring blocks with position (x, y), and $P_{x,y}$ denotes the predicted signal of the current block at position (x, y).

FIGS. 11A, 11B, 11C, 11D, 11E, and 11F illustrate examples of residual border prediction of a current block 800 (herein, a TB) according to a second mixed mode of the present disclosure. As in FIGS. 8A, 8B, 8C, 9A, 9B, 9C, 10A, 10B, and 10C, in FIGS. 11A, 11B, and 11C, the uppermost row 802 residuals of the border and the leftmost column 804 residuals are predicted from the first above row 806 and the first leftward column 808 of the reconstructed neighbors. Herein, (0, 0) denotes the upper-left position of a TB for which signs are to be predicted. Each residual of the uppermost row 802 is predicted from a different respective reconstructed sample to its upper right, while each residual of the leftmost column 804 is predicted from a different respective reconstructed sample to its upper left, such as, by way of example, as follows:

$$\text{ResPred}_{x,0} = R_{x+1,-1} - P_{x,0}$$

$$\text{ResPred}_{0,y} = R_{-1,y-1} - P_{0,y}$$

However, as in FIGS. 8D, 8E, 8F, 9D, 9E, 9F, 10D, 10E, and 10F, in FIGS. 11D, 11E, and 11F the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row 802 is predicted from two different respective reconstructed sample pixels to its upper right, while each residual of the leftmost column 804 is predicted from two different respective reconstructed sample pixels to its upper left, such as, by way of example, as follows:

$$\text{ResPred}_{x,0} = 2R_{x+1,-1} - 2R_{x+2,-2} - P_{x,0}$$

$$\text{ResPred}_{0,y} = 2R_{-1,y-1} - R_{-2,y-2} - P_{0,y}$$

Herein (as described above and repeated here for ease of reference), ResPred$_{x,y}$ denotes the predicted border residuals (shown shaded dark in FIGS. 11A, 11B, 11C, 11D, 11E, and 11F) of position (x, y) of the TB. $R_{x,y}$ denotes the reconstructed pixel of the neighboring blocks with position (x, y), and $P_{x,y}$ denotes the predicted signal of the current block at position (x, y).

FIGS. 12A, 12B, 12C, 12D, 12E, and 12F illustrate examples of residual border prediction of a current block 800 (herein, a TB) according to a third mixed mode of the present disclosure. As in FIGS. 8A, 8B, 8C, 9A, 9B, 9C, 10A, 10B, 10C, 11A, 11B, and 11C, in FIGS. 12A, 12B, and 12C, the uppermost row 802 residuals of the border and the leftmost column 804 residuals are predicted from the first above row 806 and the first leftward column 808 of the reconstructed neighbors. Herein, (0, 0) denotes the upper-left position of a TB for which signs are to be predicted. Each residual of the uppermost row 802 is predicted from a different respective reconstructed sample pixel above, while each residual of the leftmost column 804 is predicted from a different respective reconstructed sample pixel to its lower left, such as, by way of example, as follows:

$$\text{ResPred}_{x,0} = R_{x,-1} - P_{x,0}$$

$$\text{ResPred}_{0,y} = R_{-1,y+1} - R_{0,y}$$

However, as in FIGS. 8D, 8E, 8F, 9D, 9E, 9F, 10D, 10E, 10F, 11D, 11E, and 11F, in FIGS. 12D, 12E, and 12F, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row 802 is predicted from two different respective reconstructed sample pixels above, while each residual of the leftmost column 804 is predicted from two different respective reconstructed sample pixels to its lower left, such as, by way of example, as follows:

$$\text{ResPred}_{x,0} = 2R_{x,-1} - R_{x,-2} - P_{x,0}$$

$$\text{ResPred}_{0,y} = 2R_{-1,y+1} - R_{-2,y+2} - P_{0,y}$$

Herein (as described above and repeated here for ease of reference), ResPred$_{x,y}$ denotes the predicted border residuals (shown shaded dark in FIGS. 12A, 12B, 12C, 12D, 12E, and 12F) of (x, y) position of the TB. $R_{x,y}$ denotes the reconstructed pixel of the neighboring blocks with position (x, y), and $P_{x,y}$ denotes the predicted signal of the current block at (x, y) position.

FIGS. 13A, 13B, 13C, 13D, 13E, and 13F illustrate examples of residual border prediction of a current block 800 (herein, a TB) according to a fourth mixed mode of the present disclosure. As in FIGS. 8A, 8B, 8C, 9A, 9B, 9C, 10A, 10B, 10C, 11A, 11B, 11C, 12A, 12B, and 12C, in FIGS. 13A, 13B, and 13C, the uppermost row 802 residuals of the border and the leftmost column 804 residuals are predicted from the first above row 806 and the first leftward column 808 of the reconstructed neighbors. Herein, (0, 0) denotes the upper-left position of a TB for which signs are to be predicted. Each residual of the uppermost row 802 is predicted from a different respective reconstructed sample pixel above, while each residual of the leftmost column 804 is predicted from a different respective reconstructed sample pixel to its upper left, such as, by way of example, as follows:

$$\text{ResPred}_{x,0} \leq R_{x,-1} - P_{x,0}$$

$$\text{ResPred}_{0,y} = R_{-1,y-1} - P_{0,y}$$

However, as in FIGS. 8D, 8E, 8F, 9D, 9E, 9F, 10D, 10E, 10F, 11D, 11E, 11F, 12D, 12E, and 12F, in FIGS. 13D, 13E, and 13F, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row 802 is predicted from two different respective reconstructed sample pixels above, while each residual of the leftmost column 804 is predicted from two different respective reconstructed sample pixels to its upper left, such as, by way of example, as follows:

$$\text{ResPred}_{x,0} = 2R_{x,-1} - 2R_{x,-2} - P_{x,0}$$

$$\text{ResPred}_{0,y} = 2R_{-1,y-1} - R_{-2,y-2} - P_{0,y}$$

Herein (as described above and repeated here for ease of reference), $\text{ResPred}_{x,y}$ denotes the predicted border residuals (shown shaded dark in FIGS. 13A, 13B, 13C, 13D, 13E, and 13F) of (x, y) position of the TB. $R_{x,y}$ denotes the reconstructed pixel of the neighboring blocks with position (x, y), and $P_{x,y}$ denotes the predicted signal of the current block at (x, y) position.

FIGS. 14A, 14B, 14C, 14D, 14E, and 14F illustrate examples of residual border prediction of a current block 800 (herein, a TB) according to a fifth mixed mode of the present disclosure. As in FIGS. 8A, 8B, 8C, 9A, 9B, 9C, 10A, 10B, 10C, 11A, 11B, 11C, 12A, 12B, 12C, 13A, 13B, and 13C, in FIGS. 14A, 14B, and 14C, the uppermost row 802 residuals of the border and the leftmost column 804 residuals are predicted from the first above row and the first leftward column of the reconstructed neighbors. Herein, (0, 0) denotes the upper-left position of a TB for which signs are to be predicted. Each residual of the uppermost row 802 is predicted from a different respective reconstructed sample pixel to its upper left, while each residual of the leftmost column 804 is predicted from a different respective reconstructed sample pixel to its left, such as, by way of example, as follows:

$$\text{ResPred}_{x,0} = R_{x-1,-1} - P_{x,0}$$

$$\text{ResPred}_{0,y} = R_{-1,y} - P_{0,y}$$

However, as in FIGS. 8D, 8E, 8F, 9D, 9E, 9F, 10D, 10E, 10F, 11D, 11E, 11F, 12D, 12E, 12F, 13D, 13E, and 13F, in FIGS. 14D, 14E, and 14F, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row 802 is predicted from two different respective reconstructed sample pixels to its upper left, while each residual of the leftmost column 804 is predicted from two different respective reconstructed sample pixels to its left, such as, by way of example, as follows:

$$\text{ResPred}_{x,0} = 2R_{x-1,-1} - R_{x-2,-2} - P_{x,0}$$

$$\text{ResPred}_{0,y} = 2R_{-1,y} - R_{-2,y} - P_{0,y}$$

Herein (as described above and repeated here for ease of reference), $\text{ResPred}_{x,y}$ denotes the predicted border residuals (shown shaded dark in FIG. 14A, 14B, 14C, 14D, 14E, and 14F) of (x, y) position of the TB. $R_{x,y}$ denotes the reconstructed pixel of the neighboring blocks with position (x, y), and $P_{x,y}$ denotes the predicted signal of the current block at (x, y) position.

FIGS. 15A, 15B, 15C, 15D, 15E, and 15F illustrate examples of residual border prediction of a current block 800 (herein, a TB) according to a sixth mixed mode of the present disclosure. As in FIGS. 8A, 8B, 8C, 9A, 9B, 9C, 10A, 10B, 10C, 11A, 11B, 11C, 12A, 12B, 12C, 13A, 13B, 13C, 14A, 14B, and 14C, in FIGS. 15A, 15B, and 15C, the uppermost row 802 residuals of the border and the leftmost column 804 residuals are predicted from the first above row 806 and the first leftward column 808 of the reconstructed neighbors. Herein, (0, 0) denotes the upper-left position of a TB for which signs are to be predicted. Each residual of the uppermost row 802 is predicted from a different respective reconstructed sample pixel to its upper right, while each residual of the leftmost column 804 is predicted from a different respective reconstructed sample pixel to its left, such as, by way of example, as follows:

$$\text{ResPred}_{x,0} = R_{x+1,-1} - P_{x,0}$$

$$\text{ResPred}_{0,y} = R_{-1,y} - P_{0,y}$$

However, as in FIGS. 8D, 8E, 8F, 9D, 9E, 9F, 10D, 10E, 10F, 11D, 11E, 11F, 12D, 12E, 12F, 13D, 13E, 13F, 14D, 14E, and 14F, in FIGS. 15D, 15E, and 15F, the uppermost row 802 residuals of the border and the leftmost column 804 residuals are predicted from the first two above rows 806 and 810 and the first two leftward columns 808 and 812 of the reconstructed neighbors. Herein, (0, 0) denotes the upper-left position of a TB for which signs are to be predicted. Each residual of the uppermost row is predicted from two different respective reconstructed sample pixels to its upper right, while each residual of the leftmost column is predicted from two different respective reconstructed sample pixels to its left, such as, by way of example, as follows:

$$\text{ResPred}_{x,0} = 2R_{x+1,-1} - 2R_{x+2,-2} - P_{x,0}$$

$$\text{ResPred}_{0,y} = 2R_{-1,y} - R_{-2,y} - P_{0,y}$$

Herein (as described above and repeated here for ease of reference), $\text{ResPred}_{x,y}$ denotes the predicted border residuals (shown shaded dark in FIG. 15A, 15B, 15C, 15D, 15E, and 15F) of (x, y) position of the TB. $R_{x,y}$ denotes the reconstructed pixel of the neighboring blocks with position (x, y), and $P_{x,y}$ denotes the predicted signal of the current block at (x, y) position.

The nine sign prediction modes as described above are summarized below in Table 1.

| Mode | $\text{ResPred}_{x,0}$ | $\text{ResPred}_{0,y}$ |
|---|---|---|
| Default mode | $R_{x,-1} - P_{x,0}$; $-R_{x,-2} + 2R_{x,-1} - P_{x,0}$ | $R_{-1,y} - P_{0,y}$; $-R_{-2,y} + 2R_{-1,y} - P_{0,y}$ |
| Diagonal-right mode | $R_{x-1,-1} - P_{x,0}$; $2R_{x-1,-1} - R_{x-2,-2} - P_{x,0}$ | $R_{-1,y-1} - P_{0,y}$; $2R_{-1,y-1} - R_{-2,y-2} - P_{0,y}$ |
| Diagonal-left mode | $R_{x+1,-1} - P_{x,0}$; $2R_{x+1,-1} - R_{x+2,-2} - P_{x,0}$ | $R_{-1,y+1} - P_{0,y}$; $2R_{-1,y+1} - R_{-2,y+2} - P_{0,y}$ |
| First mixed mode | $R_{x-1,-1} - P_{x,0}$; $2R_{x-1,-1} R_{x-2,-2} P_{x,0}$ | R-1,y+1 - Po,yj; $2R_{-1,y+1} - R_{-2,y+2} - P_{0,y}$ |
| Second mixed mode | $R_{x+1,-1} - P_{x,0}$; $2R_{x+1,-1} - 2R_{x+2,-2} - P_{x,0}$ | $R_{-1,y-1} - P_{0,y}$; $2R_{-1,y-1} - R_{-2,y-2} - P_{0,y}$ |
| Third mixed mode | $R_{x,-1} - P_{x,0}$; $2R_{x,-1} - R_{x,-2} - P_{x,0}$ | $R_{-1,y+1} - P_{0,y}$; $2R_{-1,y+1} - R_{-2,y+2} - P_{0,y}$ |
| Fourth mixed mode | $R_{x,-1} - P_{x,0}$; $2R_{x,-1} - R_{x,-2} - P_{x,0}$ | R-1y-1 - $P_{0,y}$; $2R_{-1,y-1} - R_{-2,y-2} - P_{0,y}$ |
| Fifth mixed mode | $R_{x-1,-1} - P_{x,0}$; $2R_{x-1,-1} - R_{x-2,-2} - P_{x,0}$ | $R_{-1,y} - P_{0,y}$; $2R_{-1,y} - R_{-2,y} - P_{0,y}$ |
| Sixth mixed mode | $R_{x+1,-1} - P_{x,0}$; $2R_{x+1,-1} - R_{x+2,-2} - P_{x,0}$ | $R_{-1,y} - P_{0,y}$; $2R_{-1,y} - R_{-2,y} - P_{0,y}$ |

According to example embodiments wherein a VVC-standard encoder and a VVC-standard decoder implement multiple border prediction modes (for example, but without limitation to, the nine prediction modes shown in Table 1), a VVC-standard encoder needs to signal which prediction mode is selected for final encoding. As the VVC standard does not include multi-modal residual border prediction, example embodiments of the present disclosure further provide a VVC-standard encoder which implements border prediction mode signaling in syntax structures of coded blocks, and a VVC-standard decoder which implements border prediction mode parsing from syntax structures of coded blocks.

One or more processors of a computing system can be configured to signal border prediction modes in TB level syntax structures, and/or in CU-level syntax structures, and/or in CTU-level syntax structures, and/or in slice-level syntax structures, and/or in picture-level syntax structures, and/or in sequence-level syntax structures. In the event that border prediction mode signaling is in TB-level syntax structures, for each TB, the encoder selects a border prediction mode by minimizing the rate-distortion cost and signal to the decoder.

By way of example, example embodiments of the present disclosure introduce two syntax elements to block semantics according to VVC standards. For each TB, a VVC-standard encoder configures one or more processors of a computing system to signal a first flag (for reference herein, called default_mode_flag) in a syntax structure of the TB to indicate whether default mode is applied for residual sign prediction of that TB. If the value of default_mode_flag is equal to 1, the VVC-standard encoder will apply default mode for final encoding.

If the value of default_mode_flag is equal to 0, the VVC-standard encoder configures one or more processors of a computing system to signal a second flag (for reference herein, called borderModeIdc) using 3 bits (as per Table 2 below) in a syntax structure of the TB to indicate which non-default border prediction mode the VVC-standard encoder applies in residual sign prediction of the TB. The value borderModeIdc indicates the border prediction mode used for that TB. An example of the borderModeIdc value is shown below in Table 2.

| Mode | borderModeIdc |
| --- | --- |
| Default mode | N/A |
| Diagonal-right mode | 0 |
| Diagonal-left mode | 1 |
| First mixed mode | 2 |
| Second mixed mode | 3 |
| Third mixed mode | 4 |
| Fourth mixed mode | 5 |
| Fifth mixed mode | 6 |
| Sixth mixed mode | 7 |

By way of example, a VVC-standard encoder can further implement signaling a border prediction mode according to the following pseudo-code:

```
For each transform block
    Signal default_mode_flag
    if (default_mode_flag == 0)
        signal borderModeIdc
```

However, the VVC-standard encoder implementing signaling of a border prediction mode in a block syntax structure adds signaling bits to each coded picture, which may introduce additional overhead in bitstream transmission and impact the compression efficiency. In order to reduce the signaling overhead, the above multi-modal residual border prediction example embodiments of the present disclosure may further provide template-based border mode derivation.

According to example embodiments of the present disclosure, a VVC-standard encoder and a VVC-standard decoder each implements non-signaled, template-based border prediction mode derivation by comparing samples of a reconstructed neighboring block to multiple templates, to evaluate which among multiple templates best fits the actual reconstructed neighboring block. The neighboring blocks are reconstructed, according to coding order, before encoding and before decoding the current block, and therefore are accessible by the encoder and the decoder during the encoding process and during the decoding process for the current block.

Figure 16:
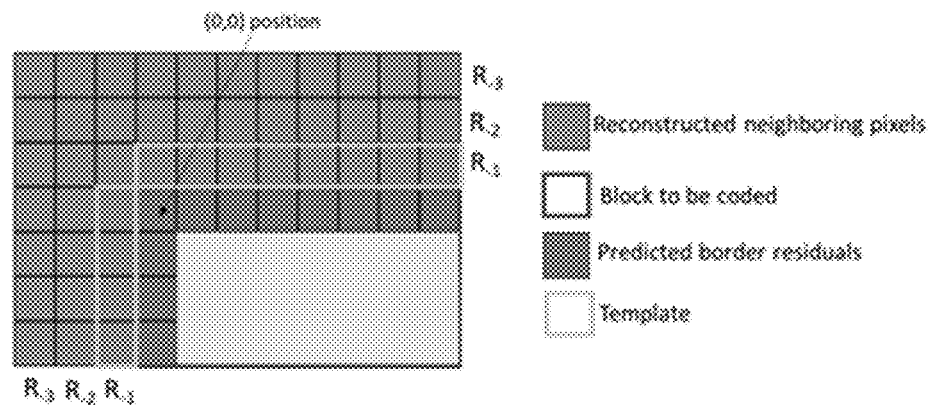
FIG. 16 illustrates an example of samples of reconstructed neighboring blocks which are compared against templates, according to example embodiments of the present disclosure.

FIG. 16 illustrates an example of samples of reconstructed neighboring blocks which are compared against templates (including samples of an upper neighboring block border highlighted in white, and samples of a left neighboring block separately highlighted in white). A first three above neighboring reconstructed pixel rows and a first three leftward neighboring reconstructed pixel columns are used to calculate the cost of each border prediction mode. For each border prediction mode described above with reference to Tables 1 and 2, a VVC-standard encoder and a VVC-standard decoder configure one or more processors of a computing system to generate a mode template by applying that respective border prediction mode in reverse to a corresponding sample of the current block.

In other words, the mode template describes, for each border prediction mode, ideal expected values of samples of reconstructed neighboring blocks if that border prediction mode fit to the corresponding samples of current block.

Fitness of each border prediction mode is evaluated by computing a cost function for a mode template and corresponding samples of a reconstructed neighboring block. By way of example, a SAD is computed between a mode template and corresponding samples of a reconstructed neighboring block as a cost of that respective border prediction mode, as follows:

$$SAD = \Sigma_{x=0}^{w} |PredTemplate_{x,-1} - R_{x,-} | Pred Template_{-1,y} - R_{-1,y}|$$

Alternatively, other cost functions such as sum of absolute transform differences ("SATD") can also be used instead of SAD.

Herein, $R_{x,y}$ denotes the reconstructed pixel of the neighboring blocks with position (x, y). (0, 0) denotes the position of the top-left sample of the current block and denoted by an arrow in FIG. 16. $PredTemplate_{x,y}$ denotes the mode template value generated at position (x, y) based on each respective border prediction mode. Computations of mode templates for each respective border prediction mode are summarized in Table 3 below.

| Mode | Top $PredTemplate_{x,-1}$ | Left $PredTemplate_{-1,y}$ |
| --- | --- | --- |
| Default mode | $R_{x,-2}$; $-R_{x,-3} + 2R_{x,-2}$ | $R_{-2,y}$; $-R_{-3,y} + 2R_{-2,y}$ |
| Diagonal-right mode | $R_{x-1,-2}$; $2R_{x-1,-2} - R_{x-2,-3}$ | $R_{-2,y-1}$; $2R_{-2,y-1} - R_{-3,y-2}$ |
| Diagonal-left mode | $R_{x+1,-2}$; $2R_{x+1,-2} - R_{x+2,-3}$ | $R_{-2,y+1}$; $2R_{-2,y+1} - R_{-3,y+2}$ |
| First mixed mode | $R_{x-1,-2}$; $2R_{x-1,-2} - R_{x-2,-3}$ | $R_{-2,y+1}$; $2R_{-2,y+1} - R_{-3,y+2}$ |
| Second mixed mode | $R_{x+1,-2}$; $2R_{x+1,-2} - 2R_{x+2,-3}$ | $R_{-2,y-1}$; $2R_{-2,y-1} - R_{-3,y-2}$ |
| Third mixed mode | $R_{x,-2}$; $2R_{x,-2} - R_{x,-3}$ | $R_{-2,y+1}$; $2R_{-2,y+1} - R_{-3,y+2}$ |
| Fourth mixed mode | $R_{x,-2}$; $2R_{x,-2} - 2R_{x,-3}$ | $R_{-2,y-1}$; $2R_{-2,y-1} - R_{-3,y-2}$ |
| Fifth mixed mode | $R_{x-1,-2}$; $2R_{x-1,-2} - R_{x-2,-3}$ | $R_{-2,y}$; $2R_{-2,y} - R_{-3,y}$ |
| Sixth mixed mode | $R_{x+1,-2}$; $2R_{x+1,-2} - 2R_{x+2,-3}$ | $R_{-2,y}$; $2R_{-2,y} - R_{-3,y}$ |

After computing cost functions for each of the border prediction modes, the border prediction mode which has the most optimal cost function output is determined as a best fit and selected for the current block.

Alternatively, example embodiments of the present disclosure provide a VVC-standard encoder and a VVC-standard decoder implementing a residual sign prediction method utilizing multi-modal residual border prediction but without signaling a first flag (such as default_mode_flag as described above) in a syntax structure to indicate whether default mode is applied for residual sign prediction. In this fashion, one bit is saved in bitstream transmission, further reducing signaling overhead.

Instead of explicitly signaling, the first flag is derived from the parity bit of the sum of the transform coefficient levels. By way of example, a VVC-standard encoder and a VVC-standard decoder can implement implicitly signaling a border prediction mode according to the following pseudo-code:

```
For each TB
    Compute sum of absolute values of the transform coefficient levels
    If sum is even
        Set default_mode_flag = 1
    Otherwise,
        Set default_mode_flag = 0.
```

It should be understood that a VVC-standard decoder can be implemented substantially similarly to the VVC-standard decoder as described above where both a first flag and a second flag are signaled, by determining a first flag implicitly signaled by this different pathway.

A VVC-standard encoder further configures one or more processors of a computing device to output the bitstream so as to satisfy the following conditions: if sum of the absolute value of the transform coefficient levels is even, use default mode; otherwise, do not use default mode.

Moreover, example embodiments of the present disclosure provide a VVC-standard encoder and a VVC-standard decoder implementing a two-step residual sign prediction method utilizing multi-modal residual border prediction.

According to a VVC-standard encoder and a VVC-standard decoder implementing a two-step sign prediction method, one or more processors of a computing system are configured to predict and reconstruct signs of a TB in two steps. First, signs of a TB are classified into two different groups. A VVC-standard encoder and a VVC-standard decoder apply only default mode to predict the signs of first group, and apply multiple border prediction modes as described above to predict the signs of the second group.

Figure 17:
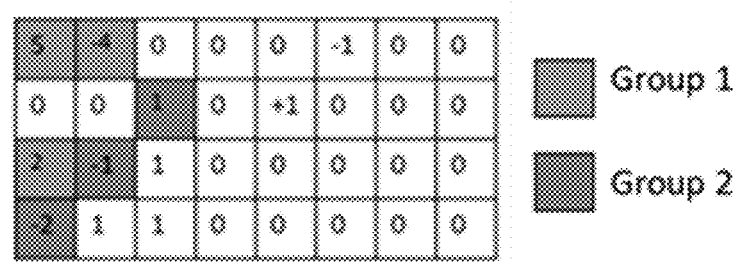
FIG. 17 illustrates an example of classifying signs of a TB into a first group and a second group according to example embodiments of the present disclosure.

FIG. 17 illustrates an example of classifying signs of a TB into a first group and a second group.

A two-step residual sign prediction method performed for a TB according to example embodiments of the present invention may include the following steps:

At a first step, one or more processors of a computing system are configured to classify n unknown signs among a first group and a second group. It should be understood that the proposed method is not limited to any specific classification or grouping method. For example, the first n/2 signs may be classified to the first group, and the rest classified to the second group. Alternatively, classification or grouping may be performed in interleaved fashion, where alternating signs are classified to each group.

Subsequently, by performing default mode sign prediction upon the signs of the first group, computing default mode sign prediction errors for these signs, a mode which fits best for the sign of the first group is selected (whether default mode or any other sign prediction mode). This is implemented according to the subsequent steps.

At a subsequent step, one or more processors of a computing system predict signs of the first group and reconstruct signs of the first group by applying a default sign prediction mode. Thus, the actual signs of the first group are now known.

At a subsequent step, one or more processors of a computing system select a sign prediction mode for the second group based on sign prediction errors of the first group, as follows:

One or more processors of a computing system predict the signs of the first group for each sign prediction mode, then compute a respective prediction error (i.e., number of correct signs, based on reconstructions of the previous step) for each non-sign prediction mode.

One or more processors of a computing system select, among all sign prediction modes, a sign prediction mode with minimum prediction error as a selected sign prediction mode.

At a subsequent step, one or more processors of a computing system predict signs of the second group and reconstruct signs of the second group by applying the selected sign prediction mode.

In one or more aspects, example embodiments of the present disclosure provide a VVC-standard encoder and a VVC-standard decoder implementing a residual sign prediction method utilizing sign prediction over the entirety of a TB or an expanded region of a TB.

In ECM 3, the sign prediction is limited to an upper-left 4×4 region of a TB. In contrast, example embodiments of the present disclosure extend a sign prediction area to the entire transform block, without limitation of locations of predicted signs within the current block (i.e., without limitation to an upper-left 4×4 region within the transform block). In other words, any signs of a TB can be predicted as long as the number of predicted signs of a TB is less than or equal to the maximum allowable limit. The maximum allowable limit is denoted by maxNumPredSigns.

Figure 18:
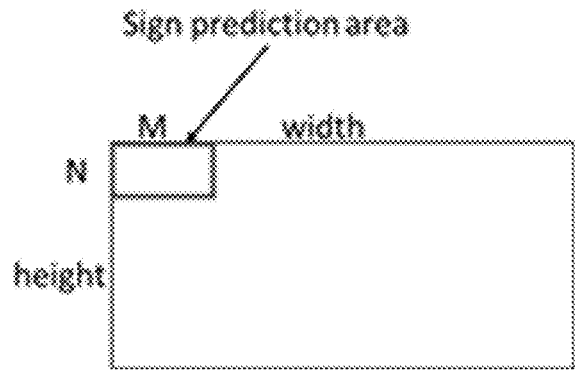
FIG. 18 illustrates an example of a TB-dependent M×N sign prediction region according to example embodiments of the present disclosure.

Alternatively, the sign prediction region (M×N) depends on width and height of the transform block. FIG. 18 illustrates an example of a TB-dependent M×N sign prediction region, where the value of M is the greater of four or one-fourth of the width of the TB, and the value of N is the greater of four or one fourth of the height of the TB, respectively computed as follows:

$$M = \max\left(4, \frac{\text{width}}{4}\right)$$

$$N = \max(4, \frac{\text{height}}{4})$$

One or more processors of a computing system predict a sign by applying residual sign prediction as described herein, given (x<M && y<N), where (x, y) is the horizontal and vertical position of the signs to be predicted; otherwise, the one or more processors signal the sign by an EP bin without prediction.

Alternatively, the sign prediction region (M×N) ix fixed. Assume maxM and maxN are the maximum value of M and N, respectively. The maxM and maxN values can be a fixed value (i.e., maxM=maxN=32) and predefined for both encoder and decoder. The values of M and N may be determined as follows:

$M=\max(\max M, \text{width})$ $N=\max(\max N, \text{height})$

Alternatively, the values of M and N may be determined as follows:

$M=\min(\text{max}M, \text{width})$ $N=\min(\text{max}N, \text{height})$

One or more processors of a computing system predict a sign by applying residual sign prediction as described herein, given (x<M && y<N), where (x, y) is the horizontal and vertical position of the signs to be predicted; otherwise, the one or more processors signal the sign by an EP bin without prediction.

Alternatively, a VVC-standard encoder signals the maximum value of M (denoted as maxM) and the maximum value of N (denoted as maxN) to a VVC-standard decoder in syntax structures, such as SPS, PPS, and the like. The values of M and N can be derived from maxM and maxN and the width and height of the current TB, as follows:

$M=\max(\text{max}M, \text{width})$ $N=\max(\text{max}N, \text{height})$

Alternatively, the values of M and N can be derived as follows:

$M=\min(\text{max}M, \text{width})$ $N=\min(\text{max}N, \text{height})$

One or more processors of a computing system initialize NumPredSign as zero before predicting the first sign of a TB, then predict a sign by applying residual sign prediction as described herein, given (x<M && y<N && NumPreSign<maxNumPreSigns), where (x, y) is the horizontal and vertical position of the signs to be predicted, and increment NumPreSign by 1; otherwise, the one or more processors signal the sign by an EP bin without prediction.

In one or more aspects, example embodiments of the present disclosure provide a VVC-standard encoder and a VVC-standard decoder implementing a residual sign prediction method utilizing an expanded maximum number of predicted signs.

In ECM 3, the maximum number of predicted signs (maxNumPredSigns) of a TB is signaled to the decoder, and the maximum allowable value is 8. According to example embodiments of the present disclosure, the maximum number may be increased to 16. Alternatively, the value of the maximum number of predicted signs (maxNumPredSigns) can be varied picture-to-picture, and signaled in syntax structures such as a slice header and/or a picture header.

In one or more aspects, example embodiments of the present disclosure provide a VVC-standard encoder and a VVC-standard decoder implementing a residual sign prediction method utilizing a sign sorting order based on residual coefficients.

Generally, sign prediction accuracy is higher if absolute value of a transform coefficient level is higher. Therefore, example embodiments of the present disclosure provide a residual sign prediction method wherein 2D transform coefficient levels are stored into a one-dimensional coefficient levels array, as described above with reference to FIG. 3.

At a subsequent step, one or more processors of a computing system sort the array by absolute values of the coefficient levels. The array is sorted in decreasing absolute value order: a residual coefficient level which has the maximum absolute value is placed at the beginning of the sorted array, and a residual coefficient level which has the minimum absolute value is placed at the end of the array. The first n signs according to corresponding array positions in the sorted array are predicted using a residual sign prediction method, and the rest of the signs are signaled by EP bins.

Figure 19:
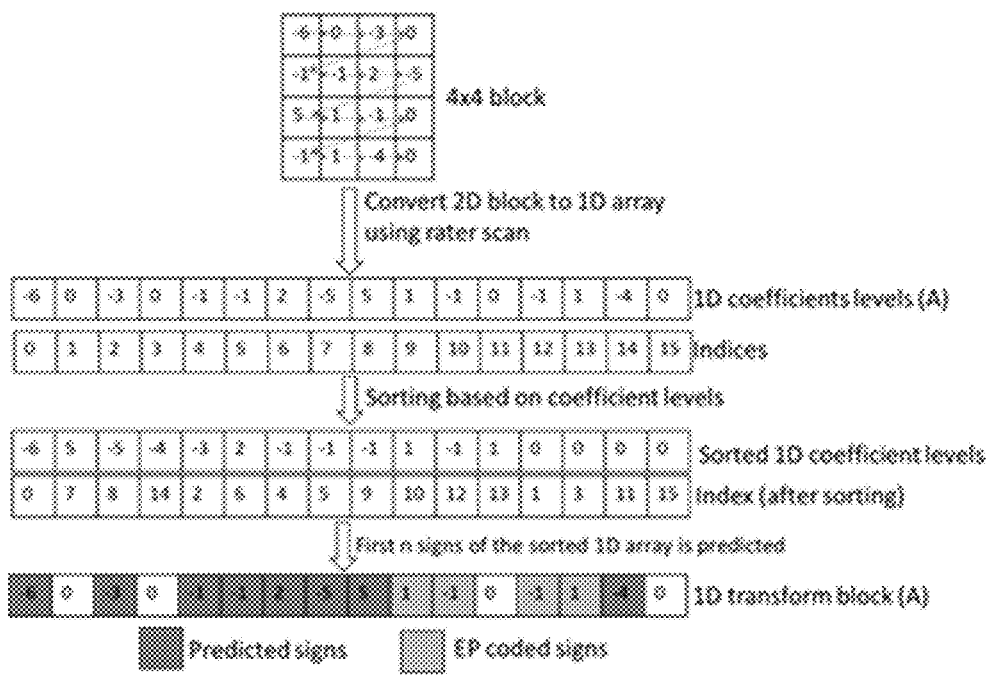
FIG. 19 illustrates an example of a residual sign prediction method utilizing a sorting order according to example embodiments of the present disclosure.

FIG. 19 illustrates an example of a residual sign prediction method utilizing a sorting order according to example embodiments of the present disclosure. By this method, the signs of the largest residual coefficient levels among a TB are prioritized for prediction.

Alternatively, example embodiments of the present disclosure provide a VVC-standard encoder and a VVC-standard decoder implementing a residual sign prediction method utilizing a sign sorting order not based on residual coefficient levels. This is motivated by in the observation that, according to ECM 3, two quantizers are implemented (Q0 and Q1), and therefore the absolute value of a level may not necessarily consistently represent the inv-quantized DCT transform coefficient level. Even for same-level values, quantization index (QIdx) may be different.

Figure 20:
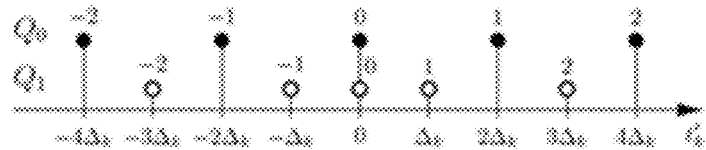
FIG. 20 illustrates discrepancies in quantization index for the same residual coefficient level between two quantizers.

FIG. 20 illustrates discrepancies in quantization index for the same residual coefficient level between two quantizers. It is shown that for same level values, the reconstruction points can be different.

Thus, to further improve sign prediction accuracy by improving sign sorting, sign sorting is performed based on corresponding QIdx values (instead of the residual coefficient level value). The QIdx of a transform coefficient level can be computed as follows:

$Q\text{Idx}=(\text{abs}(\text{level})<<1)-(\text{state} \& 1)$

Herein, the variable level is the value of the quantized transform coefficient level and "state" represents the dependent quantization state of a level. Quantization states are described in further detail in H. Schwarz, P. Haase, T. Nguyen, J. Pfaff, D. Marpe, T. Wiegand, "EE2-4.1: Results for dependent quantization with 8 states", JVET-V0082, April 2021. For a same quantization parameter, a larger QIdx represents a greater transform coefficient level after de-quantization. Thus, the first n signs according to corresponding QIdx values, ordered from largest to smallest, are predicted using a residual sign prediction method, and the rest of the signs are signaled by EP bins.

Figure 21:
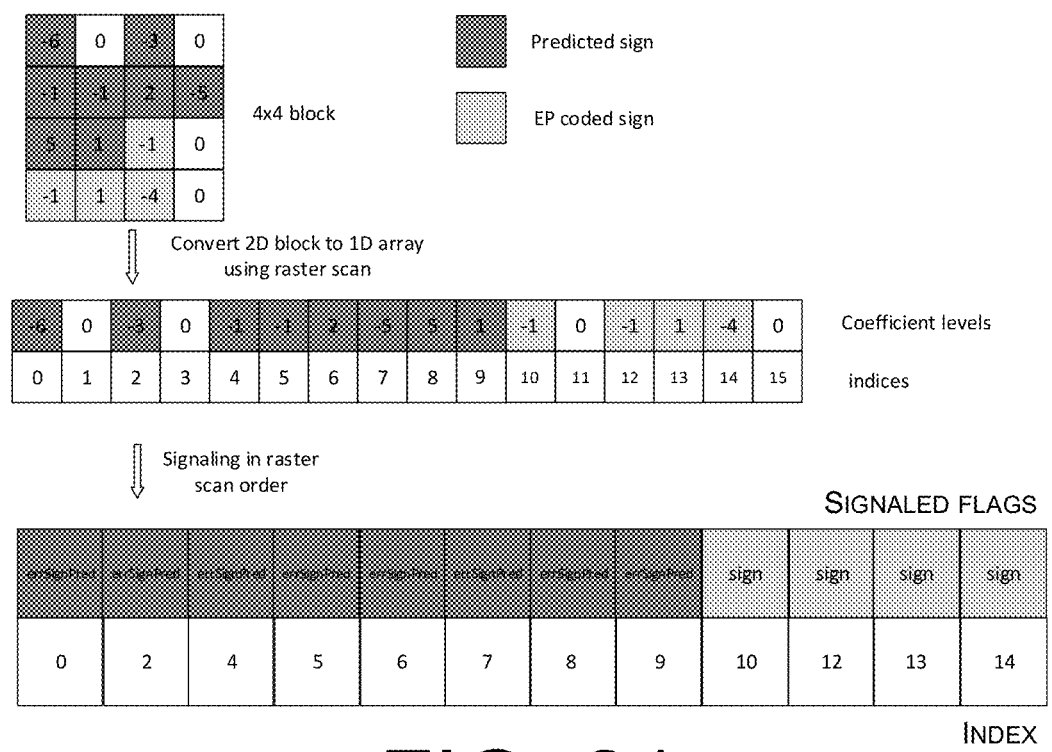
FIG. 21 illustrates a bitstream signaling order according to the ECM 3 proposal.

Subsequently, the predicted signs need to be signaled in a bitstream for later processing by a decoder. However, as described above with reference to FIGS. 4A and 4B, according to the ECM 3 proposal, the first maxNumPredSigns signs determined in a raster scanning order are predicted; thus, as illustrated in FIG. 21, the first eight non-zero signs of a block in raster scanning order are predicted and will be signaled by their errSignPred flags, and the remaining four non-zero signs are not predicted and will be signaled by EP bins.

According to ECM 3, both the errSignPred flags of the predicted coefficient levels, and the EP bin signaling of the non-predicted coefficients, are signaled in their original raster scanning order. FIG. 21 illustrates that the errSignPred flags of predicted signs are signaled first in a bitstream, followed by EP bin signals for the remaining non-predicted signs.

Figure 22:
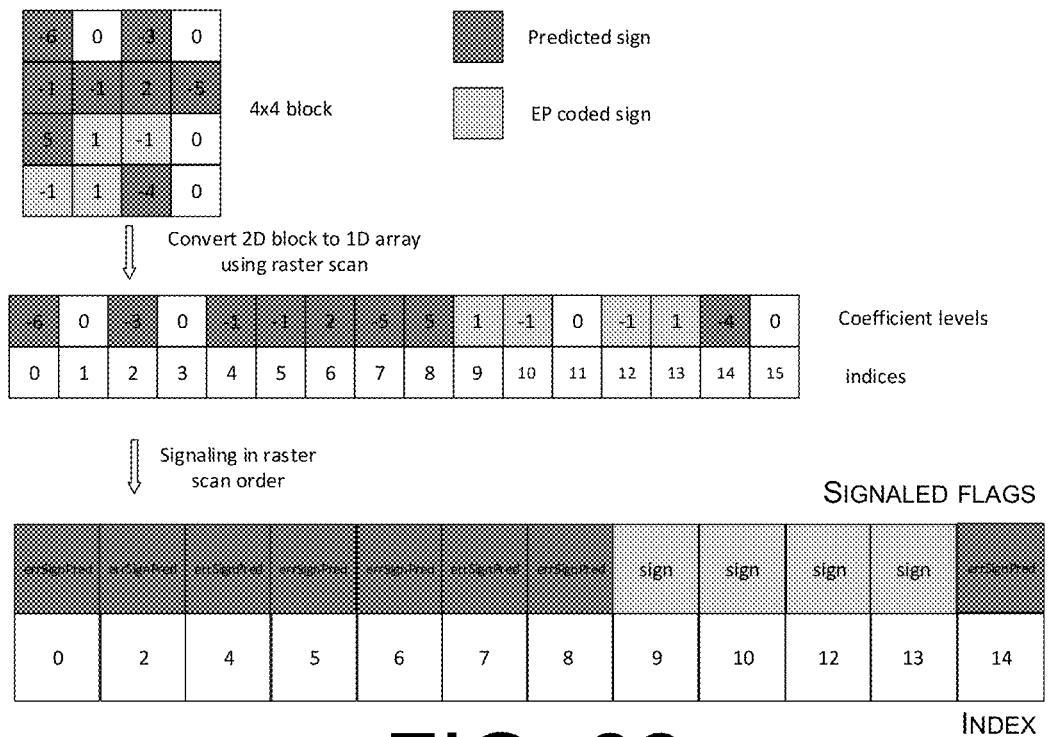
FIG. 22 illustrates a consequence of a bitstream signaling order according to the ECM 3 proposal.

However, according to the above-described residual sign prediction method utilizing a sorting order of residual coefficients, the predicted signs are not necessarily the first N signs in raster scanning order; this consequence is illustrated in FIG. 22. Thus, if the predicted and non-predicted signs were coded in a bitstream in raster scanning order, they would become interleaved as illustrated in FIG. 22.

Figure 23:
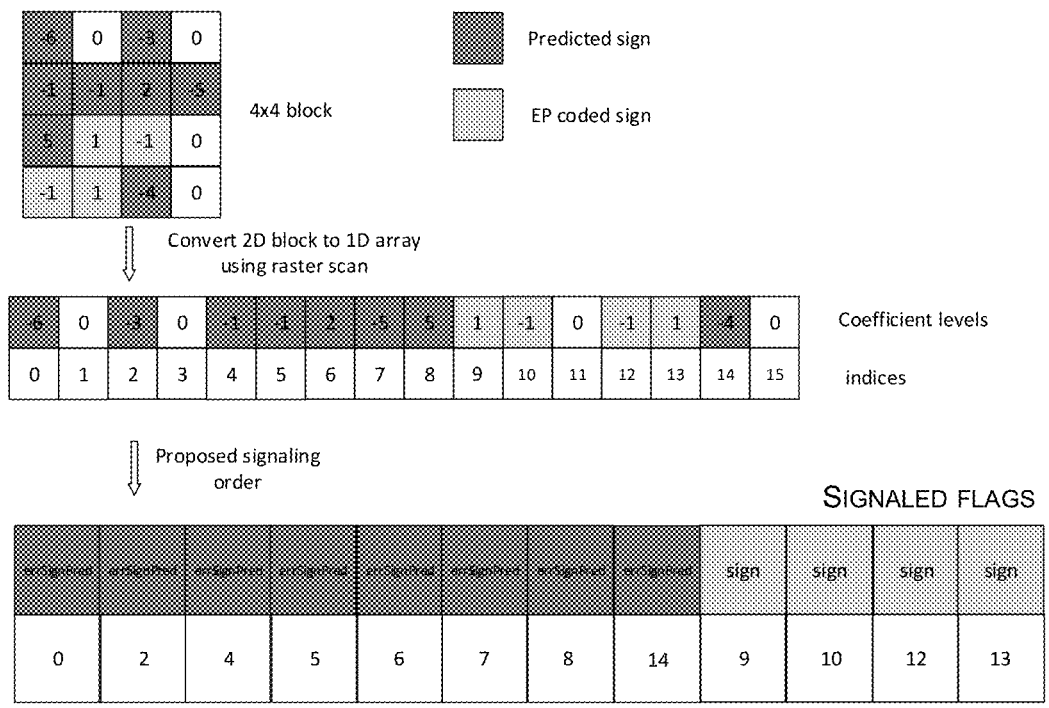
FIG. 23 illustrates a two-pass bitstream signaling method for a residual sign prediction method utilizing a sorting order according to example embodiments of the present disclosure.

To solve this problem, in one or more aspects, example embodiments of the present disclosure provide a VVC-standard encoder and a VVC-standard decoder implementing a two-pass bitstream signaling method for a residual sign prediction method utilizing a sorting order, as illustrated in FIG. 23. In a first pass, each errSignPred flag predicted for a sign of a block is signaled in the bitstream, either in raster scanning order or absolute level order, before signaling each non-predicted sign. In a second pass, each remaining non-predicted sign is signaled with an EP bin signal, each in raster scanning order, the EP bin signals trailing the flags predicted for signs.

For a CABAC entropy decoder configured to process the bitstream, it is beneficial for EP bin signals to be grouped together. The entropy decoder 152, while parsing a bitstream for coded residues of predicted signs and bypass-coded signs, determines that the bin currently being parsed is a coded residue of predicted sign, or is a bypass-coded sign. All the coded residues of predicted signs are parsed before bypass-coded signs. The entropy decoder 152 parses the sign residues and bypass-coded signs and stores them in a buffer. Then, in the reconstruction process, the VVC-standard decoder performs sign selection, allocating the sign residues and bypass-coded signs can be allocated to the coefficient correctly. The entropy decoder 152 does not need to perform sign selection in a parsing process, and sign selection can be performed later in the reconstruction process.

Figure 24:
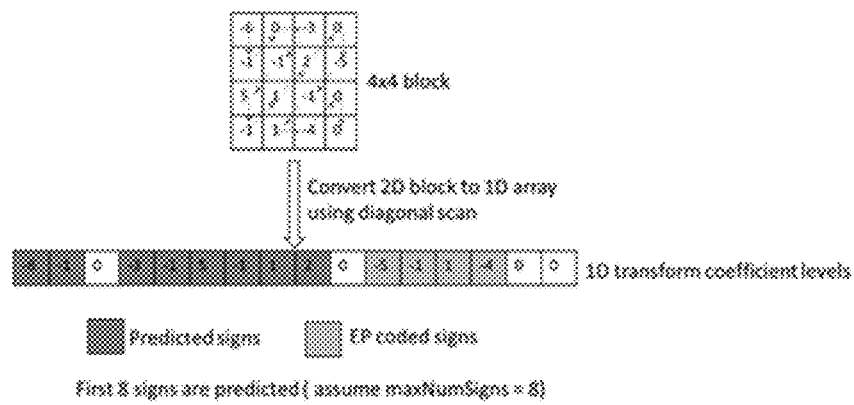
FIG. 24 illustrates a zigzag scanning order applied to the scanning order of a 4×4 region of a TB to determine signs to be predicted.

In one or more aspects, example embodiments of the present disclosure provide a VVC-standard encoder and a VVC-standard decoder implementing a residual sign prediction method utilizing a non-raster scanning order for prediction. FIG. 24 illustrates a zigzag scanning order applied to the scanning order of a 4×4 region of a TB to determine signs to be predicted (replacing raster scanning order as illustrated in FIG. 3).

In one or more aspects, example embodiments of the present disclosure provide a VVC-standard encoder and a VVC-standard decoder implementing a residual sign prediction method utilizing border prediction upon an extended border.

According to ECM 3, all hypothesis reconstruction and border prediction are performed for an uppermost row 802 and a leftmost column 804 of a TB only. Therefore, example embodiments of the present disclosure provide border prediction upon an extended border region. In one embodiment, the border area is extended to the entire transform block. In another embodiment, the border area is extended to M uppermost rows 814 and N leftmost columns 816, whereas (M=N=1 represent the border area established by ECM 3). The values of M and N can be fixed (for example M=N=2). The value of M and N can also be signaled to the decoder either in slice/picture level or SPS level.

Figure 25:
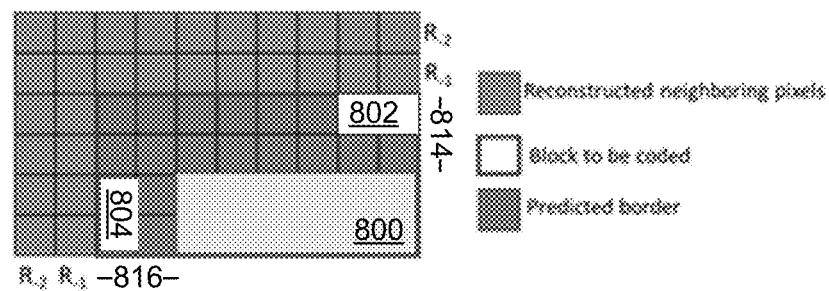
FIG. 25 illustrates an example of an extended border with M=N=2 according to example embodiments of the present disclosure.

FIG. 25 illustrates an example of an extended border with M=N=2 according to example embodiments of the present disclosure.

A VVC-standard encoder and a VVC-standard decoder implementing an extended border prediction method configure one or more processors of a computing system to compute a cost function as a sum of two sub-cost functions, each sub-cost function measuring discontinuity across respective different rows of a neighboring block and the current block or across respective different columns of a neighboring block and the current block. The first sub-cost function measures the discontinuity between $R_{-2}$, $R_{-1}$, and a candidate first row (or column, at a left border rather than upper border). The second sub-cost function measures the discontinuity between R−1, a candidate first row (or column, at a left border rather than upper border) and a candidate second row (or column, at a left border rather than upper border).

The example of the cost computation is given below:

$$\text{cost1}=\Sigma_{x=0}^{w}|\text{ResPred}_{x,0}-\text{ResRec}_{x,0}|+\Sigma_{y=0}^{h}|\text{ResPred}_{0,y}-\text{ResRec}_{0,y}|$$

Herein, $\text{ResPred}_{x,y}$ references predicted border residuals (shown shaded dark in FIG. 25) of position (x, y) of a TB, and $\text{ResRec}_{x,y}$ references reconstructed candidate residuals (described above with reference to FIG. 5) of the hypothesis at position (x, y). (0, 0) denotes the upper-left position of a TB for which signs are to be predicted, w and h are the width and height of the TB, and $P_{x,y}$ is the predicted sample at position (x, y).

$$\text{cost2}=\Sigma_{x=0}^{w}|2*\text{ResRec}_{x,0}-\text{ResRec}_{x,1}+2*P_{x,0}-P_{x,1}-R_{x,-1}|+\Sigma_{y=0}^{h}|2*\text{ResRec}_{0,y}-\text{ResRec}_{1,y}+2*P_{0,y}-P_{1,y}-R_{-1,y}|\text{cost}=\text{cost1}+\text{cost2}$$

Figure 26:
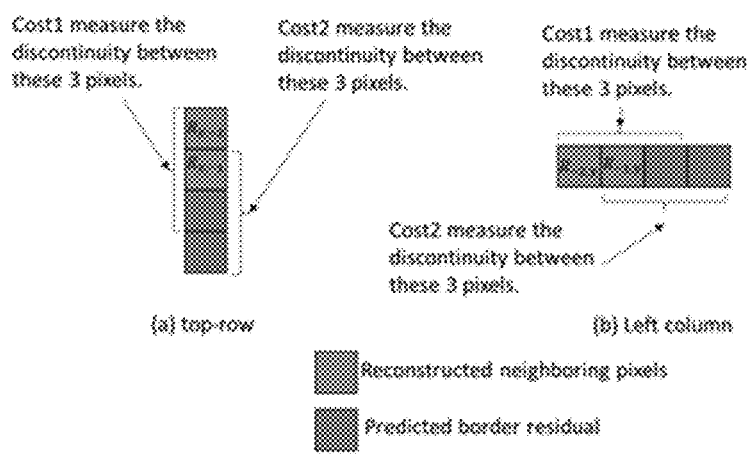
FIG. 26 illustrates an example of discontinuity measure with border extension.

FIG. 26 illustrates an example of discontinuity measure with border extension.

In one or more aspects, example embodiments of the present disclosure provide a VVC-standard encoder and a VVC-standard decoder implementing a residual sign prediction method utilizing an expanded range of residue signaling.

According to ECM 3, for each predicted sign, the encoder is configured to signal the sign residue errSignPred to the decoder. If the value of errSignPred is equal to 0, the value of a predicted sign is same as the value of an actual sign. If the value of errSignPred is equal to 1, the value of a predicted sign is not same as the value of an actual sign.

There are 4 context variables used to code errSignPred of luma component and four context models are used to code errSignPred of the chroma component. The derivation of the context variables depends on whether the CU is intra or inter-coded, and whether the signs to be predicted are either DC or AC signs. According to ECM 3, the context index is derived as follows:

```
For each TB:
    int ctxOffset = CU::isIntra(*tu.cu) ? 0 : 2;
    For each predicted sign
        Assume (x, y) is the horizontal and vertical position (from the top-left position of the TB) of a sign to be coded
        ctxIdc = (x == 0 && y == 0) ? 0 : 1
        ctxIdc += ctxOffset
```

However, the above does not take into account the additional observation that, if the number of predicted signs of a transform block is increasing, the accuracy of the sign prediction method is decreasing. Thus, according to example embodiments of the present disclosure, additional context variables are introduced to syntax structures in signal contexts wherein the number of predicted signs of the transform block is larger than the predefined threshold value. In the proposed method, 6 contexts are used for luma and 6 contexts are used for chroma. A VVC-standard encoder can implement deriving a context index according to the following pseudo-code:

```
For each TB:
    int ctxOffset = CU::isIntra(*tu.cu) ? 0 : 3;
    For each predicted sign
        Assume (x, y) is the horizontal and vertical position (from the top-left position of the TB) of a sign to be coded
        ctxIdc = (x == 0 && y == 0) ? 0 : 1
```

```
ctxIdc += ((x || y) && numSigns < Th) ? 1 : 0
ctxIdc += ctxOffset
```

Moreover, one among several context models may be selected according to the number of predicted signs of a TB. For example, if the number of predicted signs of the TB is larger than threshold A, a first context model is used; if the number of predicted signs of TB is equal to or smaller than threshold A but larger than threshold B, a second context model is used; if the number of predicted signs of TB is equal to or smaller than threshold B, a third context model is used; and so forth.

Alternatively, a VVC-standard encoder can implement deriving a context index according to the number of signs to be predicted in the TB and the order of the current bin, according to the following pseudo-code:

```
For each TB:
    int ctxOffset = CU::isIntra(*tu.cu) ? 0 : maxNumPredSigns;
    ctxIdc = numSigns;
    ctxIdc = ctxIdc+ctxOffset;
    For each predicted sign:
        Coded or decoded the current bin with ctxIdc;
        ctxIdc= ctxIdc+1;
```

Herein, maxNumPredSigns denotes a maximum number of signs to be predicted for the current sequence, and numSigns denotes a number of signs to be predicted in the current TB.

Residual sign prediction methods according to example embodiments of the present disclosure may further perform inter-prediction border pixel exclusion. As mentioned above, when an image contains an object whose edge coincides with the boundary of neighboring TBs, the assumption of high correlation between residual coefficient signs across boundaries of neighboring TBs no longer holds, and the assumption that neighboring TBs contain redundant information no longer holds.

To overcome this limitation of the cost function of the ECM 3 proposal, a VVC-standard encoder and VVC-standard decoder implement a residual sign prediction method excluding some border pixels from a cost function evaluation, and particularly excluding border pixels whose content is discontinuous to a neighboring TB.

As described above with reference to FIGS. 4A and 4B, the VVC-standard encoder and VVC-standard decoder configure one or more processors of a computing system to predict each sign among n signs to be predicted one by one, and, for a first predicted sign, the VVC-standard encoder and VVC-standard decoder configure one or more processors of a computing system to evaluate the cost function according to the ECM 3 proposal for each the $2^n$ hypotheses, the cost function evaluation including a border pixel set N containing all border pixels.

The VVC-standard encoder and VVC-standard decoder configure one or more processors of a computing system to select a hypothesis yielding the smallest cost among them, and designate a first sign of that hypothesis as a predictor of a first sign for the current block. Then the errSignPred flag of the first sign is signaled to indicate whether the prediction of the first sign is correct or not.

Subsequently, assume that the prediction of the first sign is incorrect (i.e., the sign of the current block was predicted incorrectly compared to the selected hypothesis, and the corresponding sign of the current block as predicted in the selected hypothesis); subsequently, the hypothesis designated as a predictor is referred to as A, and the correct hypothesis is referred to as B.

For each of hypotheses A and B, a VVC-standard encoder and VVC-standard decoder configure one or more processors of a computing system to calculate and compare a difference between the predicted residual and the reconstructed residual of each border pixel. That is, for a border pixel p, the difference between the predicted residual and the reconstructed residual for hypothesis A is calculated as diff_A(p) and the difference between the predicted residual and the reconstructed residual for hypothesis B is calculated as diff_B(p). Then, diff_A_B(p) is calculated as the difference between diff_B(p) and diff_A(p). If diff_B(p) is larger than diff_A(p) (i.e., diff A_B(p) is larger than 0),p is excluded from the border pixel set N.

By way of example, each pixel which introduces a larger difference between the predicted residual and the reconstructed residual for hypothesis B than hypothesis A is excluded from border pixel set N.

By way of another example, among each pixel which introduces a larger difference between the predicted residual and the reconstructed residual for hypothesis B than hypothesis A, only the first k pixels with the largest difference between the difference for hypothesis A and the difference for hypothesis B (i.e., the k pixels have the greatest value of diff_A_B( )) are excluded from border pixel set N. After excluding the border pixels, the remaining pixels are used as the border pixel set N in predicting the next bin.

Therefore, each sign prediction step resulting in an incorrect prediction triggers exclusion of one or more than one border pixel from the border pixel set N between the previous prediction and the following prediction, and only the remaining border pixels are used to predict the next sign. Excluded border pixels can be understood as pixels having content discontinuous with neighboring TBs, thereby making the cost function unreliable. Excluding such pixels can increase the accuracy of the cost function and improve the prediction accuracy accordingly.

Persons skilled in the art will appreciate that all of the above aspects of the present disclosure may be implemented concurrently in any combination thereof, and all aspects of the present disclosure may be implemented in combination as yet another embodiment of the present disclosure.

Figure 27:
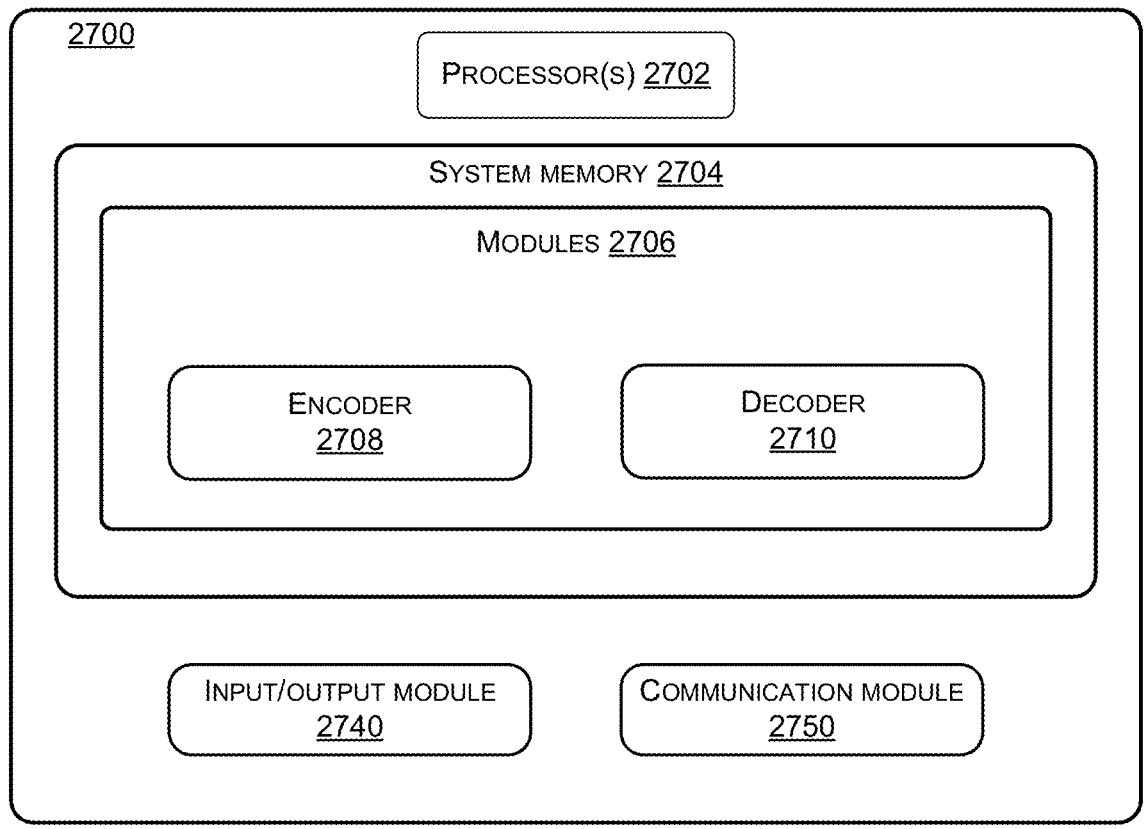
FIG. 27 illustrates an example system for implementing the processes and methods described herein for implementing residual sign prediction.

FIG. 27 illustrates an example system 2700 for implementing the processes and methods described above for implementing residual sign prediction.

The techniques and mechanisms described herein may be implemented by multiple instances of the system 2700 as well as by any other computing device, system, and/or environment. The system 2700 shown in FIG. 27 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 2700 may include one or more processors 2702 and system memory 2704 communicatively coupled to the processor(s) 2702. The processor(s) 2702 may execute one or more modules and/or processes to cause the processor(s) 2702 to perform a variety of functions. In some embodiments, the processor(s) 2702 may include a central processing unit ("CPU"), a graphics processing unit ("GPU"), both CPU and GPU, or other processing units or components known in the art. Additionally, each of the processor(s) 2702 may possess its own local memory, which also may store program modules, program data, and/or one or more operating systems.

Depending on the exact configuration and type of the system 2700, the system memory 2704 may be volatile, such as RAM, non-volatile, such as ROM, flash memory, miniature hard drive, memory card, and the like, or some combination thereof. The system memory 2704 may include one or more computer-executable modules 2706 that are executable by the processor(s) 2702.

The modules 2706 may include, but are not limited to, one or more of an encoder 2708 and a decoder 2710.

The encoder 2708 may be a VVC-standard encoder implementing any, some, or all aspects of example embodiments of the present disclosure as described above, and executable by the processor(s) 902 to configure the processor(s) 902 to perform operations as described above.

The decoder 2710 may be a VVC-standard encoder implementing any, some, or all aspects of example embodiments of the present disclosure as described above, executable by the processor(s) 2702 to configure the processor(s) 2702 to perform operations as described above.

The system 2700 may additionally include an input/output (I/O) interface 2740 for receiving image source data and bitstream data, and for outputting reconstructed pictures into a reference picture buffer or DBP and/or a display buffer. The system 2700 may also include a communication module 2750 allowing the system 2700 to communicate with other devices (not shown) over a network (not shown). The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. A computer-readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer-readable instructions stored on one or more non-transitory computer-readable storage media that, when executed by one or more processors, may perform operations described above with reference to FIGS. 1A-26. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example embodiments of the present disclosure are further described by at least the following clauses.

A. A method, comprising: predicting, by one or more processors (2702) of a computing system (2700), residual coefficient signs of an uppermost row (802) of a current block (800) and a leftmost column (804) of the current block (800); wherein at least either residual coefficient signs of the uppermost row (802) are predicted from a respective upper-left reconstructed sample or a respective upper-right reconstructed sample, or residual coefficient signs of the leftmost column (804) are predicted from a respective upper-left reconstructed sample or a respective lower-left reconstructed sample.

B. The method of paragraph A, wherein residual coefficient signs of the uppermost row (802) are predicted from a respective upper-left reconstructed sample, and residual coefficient signs of the leftmost column (804) are predicted from a respective upper-left reconstructed sample.

C. The method of paragraph B, wherein residual coefficient signs of the uppermost row (802) are predicted from two respective upper-left reconstructed samples, and residual coefficient signs of the leftmost column (804) are predicted from two respective upper-left reconstructed samples.

D. The method of paragraph A, wherein residual coefficient signs of the uppermost row (802) are predicted from a respective lower-left reconstructed sample, and residual coefficient signs of the leftmost column (804) are predicted from a respective upper-right reconstructed sample.

E. The method of paragraph D, wherein residual coefficient signs of the uppermost row (802) are predicted from two respective lower-left reconstructed samples, and residual coefficient signs of the leftmost column (804) are predicted from two respective upper-right reconstructed samples.

F. The method of paragraph A, wherein residual coefficient signs of the uppermost row (802) are predicted from a respective lower-left reconstructed sample, and residual coefficient signs of the leftmost column (804) are predicted from a respective upper-left reconstructed sample.

G. The method of paragraph F, wherein residual coefficient signs of the uppermost row (802) are predicted from two respective lower-left reconstructed samples, and residual coefficient signs of the leftmost column (804) are predicted from two respective upper-left reconstructed samples.

H. The method of paragraph A, wherein residual coefficient signs of the uppermost row (802) are predicted from a respective upper-left reconstructed sample, and residual coefficient signs of the leftmost column (804) are predicted from a respective upper-right reconstructed sample.

I. The method of paragraph H, wherein residual coefficient signs of the uppermost row (802) are predicted from two respective upper-left reconstructed samples, and residual coefficient signs of the leftmost column (804) are predicted from two respective upper-right reconstructed samples.

J. The method of paragraph A, wherein residual coefficient signs of the uppermost row (802) are predicted from a respective lower-left reconstructed sample, and residual coefficient signs of the leftmost column (804) are predicted from a respective reconstructed sample above.

K. The method of paragraph J, wherein residual coefficient signs of the uppermost row (802) are predicted from two respective lower-left reconstructed samples, and residual coefficient signs of the leftmost column (804) are predicted from two respective reconstructed samples above.

L. The method of paragraph A, wherein residual coefficient signs of the uppermost row (802) are predicted from a respective upper-left reconstructed sample, and residual coefficient signs of the leftmost column (804) are predicted from a respective reconstructed sample above.

M. The method of paragraph L, wherein residual coefficient signs of the uppermost row (802) are predicted from two respective upper-left reconstructed samples, and residual coefficient signs of the leftmost column (804) are predicted from two respective reconstructed samples above.

N. The method of paragraph A, wherein residual coefficient signs of the uppermost row (802) are predicted from a respective leftward reconstructed sample, and residual coefficient signs of the leftmost column (804) are predicted from a respective upper-left reconstructed sample.

O. The method of paragraph N, wherein residual coefficient signs of the uppermost row (802) are predicted from two respective leftward reconstructed samples, and residual coefficient signs of the leftmost column (804) are predicted from two respective upper-left reconstructed samples.

P. The method of paragraph A, wherein residual coefficient signs of the uppermost row (802) are predicted from a respective leftward reconstructed sample, and residual coefficient signs of the leftmost column (804) are predicted from a respective upper-right reconstructed sample.

Q. The method of paragraph P, wherein residual coefficient signs of the uppermost row (802) are predicted from two respective leftward reconstructed samples, and residual coefficient signs of the leftmost column (804) are predicted from two respective upper-right reconstructed samples.

R. The method of any one of paragraphs A to Q, further comprising one of: signaling, by the one or more processors (2702), a border prediction mode flag in a syntax structure of the current block (800); or parsing, by the one or more processors (2702), the border prediction mode flag from the syntax structure of the current block (800).

S. The method of paragraph R, further comprising one of: signaling, by the one or more processors (2702), a non-default border prediction mode flag in a syntax structure of the current block (800); or parsing, by the one or more processors (2702), a non-default border prediction mode flag from the syntax structure of the current block (800).

T. The method of paragraph R, further comprising one of: signaling, by the one or more processors (2702), the border prediction mode flag in the syntax structure of the current block (800) without signaling a non-default border prediction mode flag; or determining, by the one or more processors (2702), a non-default prediction mode flag from a parity bit of sum of transform coefficient levels of the current block (800).

U. The method of any one of paragraphs A to T, further comprising: generating, by the one or more processors (2702), for a plurality of border prediction modes, a respective plurality of corresponding mode templates each based on the uppermost row (802) and the leftmost column (804) of the current block (800); computing, by the one or more processors (2702), for each of the plurality of mode templates, a cost function for a mode template and corresponding samples of a reconstructed neighboring block; and selecting a border prediction mode having a most optimal cost function output for a corresponding mode template.

V. A method, comprising: classifying, by one or more processors (2702) of a computing system (2700), a first plurality of residual coefficient signs and a second plurality of residual coefficient signs of a current block (800); predicting, by the one or more processors (2702), the first plurality of residual coefficient signs by a default sign prediction mode; reconstructing, by the one or more processors (2702), the first plurality of residual coefficient signs; predicting, by the one or more processors (2702), the first plurality of residual coefficient signs by a plurality of sign prediction modes; selecting, by the one or more processors (2702), among each of the plurality of sign prediction modes, a sign prediction mode having minimum prediction error; and predicting, by the one or more processors (2702), the second plurality of residual coefficient signs by the selected sign prediction mode.

W. A method, comprising: predicting, by one or more processors (2702) of a computing system (2700), residual coefficient signs of a current block (800) without limitation of locations of predicted residual coefficient signs within the current block (800).

X. A method, comprising: predicting, by one or more processors (2702) of a computing system (2700), residual coefficient signs of a current block (800), predicted residual coefficient signs being limited to a region of the current block (800); wherein a width of the region of the current block (800) is a greater value among four and one-fourth a width of the current block (800); and wherein a height of the region of the current block (800) is a greater value among four and one-fourth a height of the current block (800).

Y. A method, comprising: predicting, by one or more processors (2702) of a computing system (2700), residual coefficient signs of a current block (800), predicted residual coefficient signs being limited to a region of the current block (800); wherein a width of the region of the current block (800) is a greater value among a fixed width and a width of the current block (800); and wherein a height of the region of the current block (800) is a greater value among a fixed height and a height of the current block (800).

Z. The method of paragraph Y, wherein residual coefficient signs are predicted up to a maximum allowable limit; and the maximum allowable limit is greater than 8, and the maximum allowable limit is signaled in a syntax structure of the current block (800).

AA. A method, comprising: sorting, by one or more processors (2702) of a computing system (2700), residual coefficient levels of a current block (800) by size; and predicting, by the one or more processors (2702), a plurality of residual coefficient signs of the current block (800) corresponding to largest residual coefficient levels of the current block (800) in sorted order.

AB. A method, comprising: sorting, by one or more processors (2702) of a computing system (2700), quantization steps of residual coefficients of a current block (800) by size; and predicting, by the one or more processors (2702), a plurality of residual coefficient signs of the current block (800) corresponding to largest quantization steps of residual coefficients of the current block (800) in sorted order.

AC. The method of paragraph AB or AC, further comprising: signaling, by the one or more processors (2702), a flag for each predicted residual coefficient sign in a bitstream before signaling non-predicted residual coefficient signs; and signaling, by the one or more processors (2702), non-predicted residual coefficient signs trailing the signaled flags.

AD. A method, comprising: predicting, by one or more processors (2702) of a computing system (2700), residual coefficient signs of a current block (800) in an order other than raster scanning order.

AE. The method of paragraph AD, wherein the residual coefficient signs of the current block (800) are predicted in zigzag scanning order.

AF. A method, comprising: predicting, by one or more processors (2702) of a computing system (2700), residual coefficient signs of a plurality of uppermost rows (814) of a current block (800) and a plurality of leftmost columns (816) of the current block (800).

AG. The method of claim AF, wherein predicting, by the one or more processors (2702), residual coefficient signs comprises computing, by the one or more processors (2702), a cost function as a sum of two sub-cost functions, each sub-cost function measuring across respective different rows of a neighboring block and the current block (800) or across respective different columns of a neighboring block and the current block (800).

AH. A method, comprising: predicting, by one or more processors (2702) of a computing system (2700), residual coefficient signs of a current block (800); and signaling, by the one or more processors (2702), one among a plurality of context models in a syntax structure of the current block according to a number of predicted residual coefficient signs.

AI. A method, comprising: predicting, by one or more processors (2702) of a computing system (2700), one among a plurality of residual coefficient signs of a current block (800) for a border pixel of the current block (800) based on a border pixel set; evaluating, by the one or more processors (2702), a cost function according to each of a plurality of hypotheses; selecting, by the one or more processors (2702), a selected hypothesis among the plurality of hypotheses yielding a smallest cost function output; determining, by the one or more processors (2702), that the first sign was predicted incorrectly compared to the selected hypothesis; calculating, by the one or more processors (2702), a difference between a predicted residual and a reconstructed residual of the border pixel; and excluding, by the one or more processors (2702), one or more border pixels having greatest differences between a predicted residual and a reconstructed residual from the border pixel set for subsequent residual sign predictions.

What is claimed is:

1. A method for encoding a video sequence, the method comprising:
   receiving a video sequence;
   encoding the video sequence by:
     predicting a plurality of transform coefficient signs of a current block corresponding to largest respective quantization indices of the transform coefficients of the current block in sorted order, wherein the plurality of transform coefficient signs are predicted up to a maximum allowable limit;
     encoding residues of the predicted plurality of transform coefficient signs and the maximum allowable limit in a syntax structure of the current block.

2. The method of claim 1, further comprising:
   bypassing coding of transform coefficient signs of the current block other than the predicted plurality of transform coefficient signs; and
   outputting a coded block comprising the encoded residues of predicted plurality of transform coefficient signs and equiprobable binary string signaling of coding-bypassed transform coefficient signs.

3. The method of claim 2, further comprising:
   encoding a residue for each predicted transform coefficient sign in a bitstream before signaling coding-bypassed transform coefficient signs; and
   encoding coding-bypassed transform coefficient signs in the bitstream trailing the encoded residue.

4. The method of claim 1, further comprising:
   recording the quantization indices of the transform coefficients of the current block as elements of an array in raster scanning order; and
   sorting the elements of the array by size to yield a sorted array.

5. The method of claim 4, wherein predicting a plurality of transform coefficient signs of the current block corresponding to largest quantization indices comprises predicting each transform coefficient corresponding to quantization indices recorded in a plurality of elements at an end of the sorted array.

6. The method of claim 1, wherein:
   the predicted plurality of transform coefficient signs are limited to a region of the current block;
   a width of the region of the current block is a lesser value among a fixed width and a width of the current block; and
   a height of the region of the current block is a lesser value among a fixed height and a height of the current block.

7. The method of claim 6, further comprising:
   encoding the fixed width and the fixed height in the syntax structure of the current block.

8. The method of claim 1, wherein
the maximum allowable limit is greater than 8.

9. A method for decoding a bitstream, the method comprising:
receiving a bitstream; and
decoding the bitstream to output a video sequence, the decoding comprising:
decoding a plurality of entropy-coded transform coefficients of a current block to yield decoded transform coefficients of the current block;
decoding a maximum allowable limit of a predicted plurality of transform coefficient signs; and
reconstructing the current block based on residues of the predicted plurality of transform coefficient signs of reconstructed residuals of the current block corresponding to largest respective quantization indices of the transform coefficients of reconstructed residuals of the current block in sorted order; wherein the plurality of transform coefficient signs are predicted up to the maximum allowable limit.

10. The method of claim 9, further comprising:
parsing, by the entropy decoder, a plurality of residues of predicted transform coefficient signs from a syntax structure of the current block; and
inverse quantizing and inverse transforming the decoded transform coefficients and the plurality of residues of transform coefficient signs to yield reconstructed residuals of the current block.

11. The method of claim 10, further comprising:
recording quantization indices of transform coefficients of reconstructed residuals of the current block as elements of an array in raster scanning order; and
sorting the elements of the array by size to yield a sorted array.

12. The method of claim 11, wherein yielding reconstructed residuals of the current block comprises selecting a plurality of transform coefficient signs of reconstructed residuals of the current block corresponding to largest quantization indices comprises predicting each transform coefficient corresponding to quantization indices recorded in a plurality of elements at an end of the sorted array.

13. The method of claim 11, further comprising adding the reconstructed residuals of the current block and a prediction signal comprising the plurality of transform coefficient signs to yield a reconstructed block.

14. The method of claim 9, wherein:
the predicted plurality of transform coefficient signs are limited to a region of the current block;
a width of the region of the current block is a lesser value among a fixed width and a width of the current block; and
a height of the region of the current block is a lesser value among a fixed height and a height of the current block.

15. The method of claim 14, further comprising: parsing the fixed width and the fixed height from a syntax structure of the current block.

16. A non-transitory computer-readable storage medium storing a bitstream, the bitstream generated by receiving a video sequence, encoding the video sequence to generate coded information included in the bitstream, and transmit the bitstream, wherein the encoding comprises:
predicting a plurality of transform coefficient signs of a current block corresponding to largest respective quantization indices of the transform coefficients of the current block in sorted order, wherein the plurality of transform coefficient signs are predicted up to a maximum allowable limit; and
encoding residues of the predicted plurality of transform coefficient signs and the maximum allowable limit in a syntax structure of the current block.

17. The non-transitory computer-readable storage medium of claim 16, wherein the encoding further comprises:
bypassing coding of transform coefficient signs of the current block other than the predicted plurality of transform coefficient signs; and
outputting a coded block comprising the encoded residues of predicted plurality of transform coefficient signs and equiprobable binary string signaling of coding-bypassed transform coefficient signs.

18. The non-transitory computer-readable storage medium of claim 16, wherein the encoding further comprises:
recording the quantization indices of the transform coefficients of the current block as elements of an array in raster scanning order; and
sorting the elements of the array by size to yield a sorted array.

19. The non-transitory computer-readable storage medium of claim 16, wherein the predicted plurality of transform coefficient signs are limited to a region of the current block;
a width of the region of the current block is a lesser value among a fixed width and a width of the current block; and
a height of the region of the current block is a lesser value among a fixed height and a height of the current block.

20. The non-transitory computer-readable storage medium of claim 19, wherein the encoding further comprising:
encoding the fixed width and the fixed height in the syntax structure of the current block.

* * * * *